US011958677B2

(12) United States Patent
Germain et al.

(10) Patent No.: US 11,958,677 B2
(45) Date of Patent: Apr. 16, 2024

(54) BIOTIC MATERIAL APPARATUS FOR THERMALLY PROTECTING AND/OR TRANSPORTING TEMPERATURE SENSITIVE PRODUCTS

(71) Applicant: ILLUMINATE CONSULTING, LLC, Tampa, FL (US)

(72) Inventors: Melissa Germain, Tampa, FL (US); Jean-Pierre Emond, Tampa, FL (US)

(73) Assignee: ILLUMINATE CONSULTING, LLC, Tampa, FL (US)

( * ) Notice: Subject to any disclaimer, the term of this patent is extended or adjusted under 35 U.S.C. 154(b) by 364 days.

(21) Appl. No.: 17/256,462

(22) PCT Filed: Jun. 28, 2019

(86) PCT No.: PCT/US2019/039897
§ 371 (c)(1),
(2) Date: Dec. 28, 2020

(87) PCT Pub. No.: WO2020/006460
PCT Pub. Date: Jan. 20, 2020

(65) Prior Publication Data
US 2021/0269225 A1 Sep. 2, 2021

Related U.S. Application Data

(60) Provisional application No. 62/691,378, filed on Jun. 28, 2018.

(51) Int. Cl.
*B65D 81/38* (2006.01)
*B65D 65/46* (2006.01)

(52) U.S. Cl.
CPC ....... *B65D 81/3897* (2013.01); *B65D 65/466* (2013.01); *B65D 81/3823* (2013.01); *B65D 2577/00* (2013.01)

(58) Field of Classification Search
CPC .............. B65D 65/466; B65D 81/3823; B65D 81/3897; B65D 2577/00
See application file for complete search history.

(56) References Cited

U.S. PATENT DOCUMENTS

| 2,523,145 A | 9/1950 | Robinson |
| 5,669,233 A * | 9/1997 | Cook ................. B65D 81/3823 |
| | | 62/457.2 |

(Continued)

FOREIGN PATENT DOCUMENTS

WO 2014118821 A1 8/2014

OTHER PUBLICATIONS

Suresh, Babu R. "Investigation of Thermal Insulation on Ice Coolers," IOSR-JMCE, vol. 12, Issue 1:75-79, Jan.-Feb. 2015.

(Continued)

*Primary Examiner* — Andrew T Kirsch
(74) *Attorney, Agent, or Firm* — SALIWANCHIK, LLOYD & EISENSCHENK

(57) ABSTRACT

Embodiments of the subject invention relate to a method and apparatus for shipping products so as to control the temperatures the products are exposed to. Embodiments can increase the amount of time the product and/or portions of the product experience a desired temperature range and/or reduce the amount of time the product and/or portions of the product experience temperatures outside of the desired temperature range and/or experience an undesirable temperature range. Embodiments can incorporate biotic materials, such as wood fibers or moss, positioned around and/or near the product positioned inside a packaging container or around a pallet load, such that the biotic materials restrict heat flow from one or more locations on the exterior of the package to one or more other locations in the interior of the package.

57 Claims, 13 Drawing Sheets

(56) References Cited

U.S. PATENT DOCUMENTS

| | | |
|---|---|---|
| 2005/0214537 A1 | 9/2005 | Pohlmann |
| 2008/0086982 A1 | 4/2008 | Parenteau et al. |
| 2009/0068430 A1* | 3/2009 | Troger .................. D21H 15/10 428/338 |
| 2016/0355320 A1 | 12/2016 | Maier-Eschenlohr et al. |

OTHER PUBLICATIONS

Gaiselmann, Gerd "Extraction of Curved Fibers from 3D Data," Image Anal Stereol 32:57-63, 2013.
Woodside, William "Calculation of the Thermal Conductivity of Porous Media," Can. J. Phys. 36(7): 815-823, Jul. 1958.
International Search Report dated Oct. 29, 2019 in Internation Application No. PCT/US2019/039897.

* cited by examiner

BIOTIC MATERIAL APPARATUS FOR THERMALLY PROTECTING AND/OR TRANSPORTING TEMPERATURE SENSITIVE PRODUCTS

CROSS REFERENCE TO RELATED APPLICATIONS

This application is a National Stage Application of International Application Number PCT/US2019/039897, filed Jun. 28, 2019; which claims priority to U.S. Provisional Application No. 62/691,378, filed Jun. 28, 2018.

FIELD OF INVENTION

Embodiments of the subject invention relate to a method and apparatus to isolate the thermal environment of a payload using an environmentally friendly apparatus, such as an environmentally friendly packaging system for temperature sensitive products, in order to protect the payload from undesirable temperatures without the use of harmful and resource consuming Expanded polystyrene (EPS).

BACKGROUND OF INVENTION

The most common packaging systems for transporting temperature sensitive products use an insulated container and a cold bank, to provide thermal protection for a load, product, or payload. Typically, an environment of the load is maintained in a temperature range of 2-8° C., 20-25° C., 0-4° C., or below −18° C. in order to provide thermal protection of the load. The food and pharmaceutical industries have relied on insulated shipping containers, such as Expanded Polystyrene (EPS), Polyurethane foam (PUR), mylar bubble wrap, polypropylene foam, and vacuum insulated panels (VIP) to ship and distribute temperature sensitive products. To produce these materials significant amounts of resources are required, such as energy and water consumption, use of non-renewable fossil fuels and synthetic chemicals, as well as emitting high levels of carbon dioxide (carbon footprint). The finished insulation products are often only used one time and when their end of the lifecycle occurs, they are often not recyclable and/or are minimally biodegradable, causing significant amounts of waste and accumulation in landfills. Due to the large amount of waste generated by the production, use, and disposable of traditional insulation materials, consumers desire alternative solutions and cities have implemented ordinances on fully or partially banning the certain materials.

BRIEF SUMMARY

Embodiments of the invention relate to a biotic material structure (BMS) that is formed by a plurality of pieces of biotic material (PPBM), positioned with respect to each other and mechanically interacting with each other so as to have a plurality of voids between the individual pieces of biotic material. The individual pieces of biotic material (PBM) can be filaments, particles, and/or other structural forms of biotic material. The individual pieces of biotic material can be positioned with respect to each other and mechanically interacting with each other so as to: push against each other, intertwine with each other, attach to each other (e.g., via adhesive or other material), pull against each other, and/or torque each other, so as to maintain voids between each other even when forces are applied to the BMS formed by the PPBM. Embodiments relate to a biotic material insulation medium (BMIM) that is formed by the biotic material structure and a gas or gas mixture (such as air) filling the plurality of voids between the individual PBM. As the default gas filling the voids between the individual PMS is air, the assumption in the description throughout the subject application is that air fills such voids, unless another gas or gas mixture is identified, with the understanding that the air can be replaced with another gas or gas mixture in other specific embodiments having the same BMS.

Embodiments relate to a biotic material insulating structure (BMIS), incorporating a BMIM in accordance with an embodiment of the invention and a mechanical structure positioned with respect to the BMIM so as to contain the BMIM to a desired BMS (e.g., having a desired volumetric shape or range of shapes). An embodiment of the subject BMIS, such as an insulating pad, panel, container, blanket, or other structure, can then be used to insulate products during storage or transport, and/or be incorporated into an insulating packaging container used to insulate products during storage or transport. In an embodiment such an insulating packaging container can incorporate an insulating panel for insulating a load. In an embodiment, an insulating packaging container assembly can incorporate the insulating packaging container for insulating a load. Embodiments relate to methods for insulating a load that utilize the biotic material structure, the BMIM, the BMIS, the insulating packaging container, and/or the insulating packaging container assembly.

Embodiments provide the temperature sensitive transportation industry with an environmentally friendly alternative to the current insulation materials. Embodiments are useful for insulation, as well as environmentally friendly, and meet one or more, and preferably all, of the following parameters: being an effective insulator, having a low cost, being lightweight so as to reduce handling difficulties and shipping costs, and efficiently utilizing storage space. Embodiments of the subject biotic material structure incorporate a renewable resource that has been minimally modified from its natural structure, requires no, or an inconsequential amount of, water to produce, utilize minimal energy to produce, and do not usually involve the use of unnatural products, pesticides, or chemicals. Once the biotic material structure reaches the end of its life cycle, the biotic material structure can be naturally biodegraded and decomposed. Embodiments of the biotic material structure meet the ASTM D6400 standard for compostability, the ASTM D5338 standard for compostability, the EN 13432:2000 packaging composting standard, and/or the EN 14995:2006 plastics composting standard. Embodiments of the biotic material structure can be used for personal compost or commercial compost. Embodiments of the biotic material structure (BMS) can be disposed of in a traditional trash system or yard waste collection, such that the BMS naturally decomposes. Micales and Skog (1997) reported that the placement of forest products in landfills serves as an important carbon sink, and a large portion of this sinked carbon is permanently sequestered in the soil where its impact on global warming is negligible.

Embodiments of the subject invention relate to a method and apparatus, incorporating the subject BMS, for shipping products so as to control the temperatures the products are exposed to. Embodiments can increase the amount of time the product and/or portions of the product experience a desired temperature range and/or reduce the amount of time the product and/or portions of the product experience temperatures outside of the desired temperature range and/or experience an undesirable temperature range. Embodiments of the BMS can incorporate biotic materials, such as wood fibers or moss, and can be positioned around and/or near the product positioned by itself, inside a packaging container or around a pallet load, such that the biotic material structure restricts heat flow from one or more locations on the exterior of the package to one or more other locations in the interior of the package, and/or vice versa.

EMBODIMENTS

Embodiment 1. A method of providing a thermal environment to a payload transported and/or stored in a surrounding environment, comprising:
  providing a packaging container having an inner surface and an outer surface, wherein the inner surface defines an interior of the container;
  providing a biotic material insulation medium,
  wherein the biotic material insulation medium comprises a plurality of particles of biotic material having voids between the particles of the plurality of particles of biotic material, wherein the voids have a gas or gas mixture therein;
  providing a mechanical structure;
  positioning a payload in the interior of the packaging container;
  positioning the biotic material insulation medium with respect to the payload such that the biotic material insulation medium is between at least a portion of the payload and the outer surface of the container;
  positioning the mechanical structure with respect to the biotic material insulation medium such that the mechanical structure provides mechanical support to the biotic material insulation medium so that the biotic material insulation medium surrounds at least 50% of the payload; and
  positioning the packaging container, with the biotic material insulation medium and mechanical structure, in a surrounding environment,
  wherein the surrounding environment has a surrounding temperature that is (i) above, or (ii) below, respectively, a desired temperature range; and
  wherein, when the packaging container, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment into the interior of the packaging container, or (ii) reduces a rate at which the payload dissipates heat that transfers from into the interior of the packaging container into the surrounding environment.

Embodiment 2. The method according to embodiment 1, wherein the plurality of particles of biotic material is a plurality of filaments of biotic material, and the biotic material insulation medium is a biotic filament insulation medium.

Embodiment 3. The method according to embodiment 2, wherein the plurality of filaments of biotic material is:
a plurality of filaments of woody biotic material;
a plurality of filaments of bryophyte biotic material; and/or
a plurality of filaments of herbaceous biotic material; and/or
a plurality of filaments of fungi biotic material.

Embodiment 4. The method according to any of embodiments 2-3,
  wherein the filaments of biotic material are derived from a renewable resource that has been nominally modified from its natural structure, and naturally biodegrades and decomposes.

Embodiment 5. The method according to any of embodiments 2-4,
  wherein producing the filaments of biotic material from the renewable resource require no, or an inconsequential amount of water, to produce, utilizes minimal energy, and does not use unnatural products and pesticides.

Embodiment 6. The method according to any of embodiments 2-5,
  wherein at least a portion of the biotic filament insulation medium has an apparent bulk density in a range from 20 kg/m$^3$ to 140 kg/m$^3$.

Embodiment 7. The method according to any of embodiments 2-6,
  wherein at least a portion of the biotic filament insulation medium has an apparent bulk density in a range from 25 kg/m$^3$ to 90 kg/m$^3$, from 25 kg/m$^3$ to 70 kg/m$^3$, from 35 kg/m$^3$ to 80 kg/m$^3$, and/or from 45 kg/m$^3$ to 55 kg/m$^3$.

Embodiment 8. The method according to any of embodiments 2-7,
  wherein the filaments of biotic material of the plurality of filaments of biotic material have a density ranging from 96 kg/m$^3$ to 960 kg/m$^3$, from 150 kg/m$^3$ to 170 kg/m$^3$, from 400 kg/m$^3$ to 440 kg/m$^3$, and/or from 150 kg/m$^3$ to 450 kg/m$^3$.

Embodiment 9. The method according to any of embodiments 2-8,
  wherein the plurality of filaments of biotic material is a plurality of filaments of woody biotic material,
  wherein each filament of woody biotic material of the plurality of filaments of woody biotic material has a modulus of elasticity ranging from 500 kg/mm$^2$ to 1600 kg/mm$^2$.

Embodiment 10. The method according to embodiment 9,
  wherein each filament of woody biotic material of the plurality of filaments of woody biotic material has a modulus of rupture ranging from 4 kg/mm$^2$ to 14 kg/mm$^2$.

Embodiment 11. The method according to any of embodiments 2-10,
  wherein the biotic filament insulation medium has an apparent porosity of at least 0.5. at least 0.6, at least 0.65, at least 0.7, at least 0.75, at least 0.8, and/or at least 0.85.

Embodiment 12. The method according to any of embodiments 2-11,
  wherein the biotic filament insulation medium has an apparent porosity of at least 0.8.

Embodiment 13. The method according to any of embodiments 2-12,
  wherein at least 10% of the voids between the filaments of the biotic filament insulation medium are larger than 1 cubic millimeter.

Embodiment 14. The method according to any preceding embodiment,
  wherein the desired temperature range is 2-8° C., 20-25° C., 0-5° C., 2-4° C., 10-15° C., 15-30° C., 2-30° C., −40-30° C., or below −18° C.

Embodiment 15. The method according to any of embodiments 2-14,
  wherein the biotic filament insulation medium consists of filaments of a single type of biotic material or comprises filaments of a plurality of types of biotic materials.

Embodiment 16. The method according to any of embodiments 2-15,
  wherein the filaments of the plurality of filaments of biotic material have an overall tortuosity greater than 1.0.

Embodiment 17. The method according to any of embodiments 2-16,
  wherein the plurality of filaments of biotic material is moss.

Embodiment 18. The method according to any of embodiments 2-17,
  wherein the plurality of filaments of biotic material is aspen and/or great lakes aspen.

Embodiment 19. The method according to any of embodiments 2-18,
  wherein the plurality of filaments of biotic material is wood.

Embodiment 20. The method according to any of embodiments 2-19,
  wherein a first portion of the filaments of the plurality of filaments of biotic material are moss and the remaining filaments of the plurality of filaments of biotic material are wood.

Embodiment 21. The method according to any of embodiments 2-20,
  wherein the filaments of the plurality of filaments of biotic material are dried by solar drying process.

Embodiment 22. The method according to any of embodiments 2-21,
  wherein the plurality of filaments of biotic material is compostable in accordance with the ASTM D6400, ASTM D5338, EN 13432:2000, and/or EN 14995:2006 plastic composting standards.

Embodiment 23. The method according to any of embodiments 2-22,
  wherein the biotic filament insulation medium is compostable in accordance with the ASTM D6400, ASTM D5338, EN 13432:2000, and/or EN 14995:2006 plastic composting standards.

Embodiment 24. The method according to any preceding embodiment,
  wherein the biotic material insulation medium has a thermal conductivity in the range from 0.015 to 0.3 W/m-K and/or from 0.015 to 0.08 W/m-K.

Embodiment 25. The method according to any of embodiments 2-24,
  wherein at least a portion of the biotic filament insulation medium facing toward the outer surface of the container has an effective thermal effusivity of less than 125 W-s$^{1/2}$/m$^2$-K.

Embodiment 26. The method according to any preceding embodiment,
  wherein the biotic material insulation medium has an R-value for a thickness of 25.=0.4 mm (1 inch) in the range 0.35 to 0.88 m$^2$K/W for an apparent bulk density in the range 25 to 120 kg/m$^2$.

Embodiment 27. The method according to any of embodiments 2-26,
  wherein at least 10% of the filaments of the plurality of filaments of biotic material are longer than 15 mm.

Embodiment 28. The method according to any of embodiments 2-27,
  wherein at least 80% of the filaments of the plurality of filaments of biotic material are longer than 3.0 inches.

Embodiment 29. The method according to any of embodiments 2-28,
  wherein the filaments of the plurality of filaments of biotic material are irregular shaped and/or do not have a smooth surface.

Embodiment 30. The method according to any of embodiments 2-29,
  wherein the filaments of the plurality of filaments of biotic material have a cross-sectional shape selected from the group consisting of; rectangular, round, triangular, square, flat, spherical, polyhedron, and tubular.

Embodiment 31. The method according to any preceding embodiment,
  wherein the voids reduce heat transfer by conduction to or from the payload.

Embodiment 32. The method according to any of embodiments 2-31,
  wherein the biotic filament insulation medium comprises loose materials between portions of the mechanical structure.

Embodiment 33. The method according to embodiment 32,
  wherein the portions of the mechanical structure are made of paper and/or plastic.

Embodiment 34. The method according to any of embodiments 2-33,
  wherein the biotic filament insulation medium allows gas and water vapor exchange.

Embodiment 35. The method according to any of embodiments 2-34,
  wherein the biotic filament insulation medium has a permeance for oxygen of at least $15.6 \times 10^3$ L$_{O2}$/(m$^2$ atm d).

Embodiment 36. The method according to any of embodiments 2-35,
  wherein the biotic filament insulation medium has a permeance for carbon dioxide of at least $23.4 \times 10^3$ L$_{CO2}$/(m$^2$ atm d).

Embodiment 37. The method according to any of embodiments 2-36,
  wherein the biotic filament insulation medium has a permeance for water vapor of at least $1 \times 10^3$ g$_{water}$/(m$^2$ atm d)

Embodiment 38. The method according to any of embodiments 2-37,
  wherein the biotic filament insulation medium is a nonwoven structure in the form of a mat, pad, pouch, liner, envelope, or cover.

Embodiment 39. The method according to any of embodiments 2-38,
  wherein the biotic filament insulation medium has an apparent porosity of at least 50% and/or at least 70%, where the voids are filled by argon or helium.

Embodiment 40. The method according to any of embodiments 2-39,
  wherein the biotic filament insulation medium has an apparent porosity of at least 50% at and/or least 70%, where the voids are filled by air.

Embodiment 41. The method according to any of embodiments 2-40,
  wherein the biotic filament insulation medium surrounds essentially 100% of the payload.

Embodiment 42. The method according to any of embodiments 2-41,
wherein the biotic filament insulation medium surrounds at least 90% of the payload.

Embodiment 43. The method according to any of embodiments 2-42,
wherein the biotic filament insulation medium can absorb liquids when in contact with liquids or by vapor transmission.

Embodiment 44. The method according to any of embodiments 2-43,
wherein the biotic filament insulation medium can absorb at least 100%, at least 200%, and/or at least 300% of its weight in liquids.

Embodiment 45. The method according to any of embodiments 2-44,
wherein the biotic filament insulation medium, when absorbing liquids, which raises the thermal conductivity of the biotic filament insulation medium per unit thickness, can expand such that an effective thermal conductivity of the expanded biotic filament insulation medium is lower than the raised thermal conductivity of the biotic filament insulation medium per unit thickness.

Embodiment 46. The method according to any of embodiments 2-45,
wherein the biotic filament insulation medium shrinks or expands depending on a humidity level of a portion of the interior of the container the biotic filament insulation medium is exposed to and absorption of water into the filaments of the biotic filament insulation medium, or evaporation of water out of the filaments of the biotic filament insulation medium.

Embodiment 47. The method according to any of embodiments 2-46.
wherein the biotic filament insulation medium can be compressed by compressive pressure to less than 90% of its initial thickness and recover some of its thickness after the compressive pressure is released.

Embodiment 48. The method according to any of embodiments 2-47,
wherein the biotic filament insulation medium can be compressed by compressive pressure to less than 50% of its initial thickness and recover some of its thickness after the compressive pressure is released.

Embodiment 49. The method according to any of embodiments 2-48,
wherein the filaments of the biotic filament insulation medium have a water content of 22% to 25%, 18% to 22%, and/or 19% to 21%.

Embodiment 50. The method according to any of embodiments 2-49,
wherein the filaments of the biotic filament insulation medium are flexible.

Embodiment 51. The method according to any of embodiments 2-50,
wherein the filaments of the biotic filament insulation medium have a water content of 10% to 35%.

Embodiment 52. The method according to any of embodiments 2-51,
wherein the filaments of the biotic filament insulation medium are semi-rigid.

Embodiment 53. The method according to any of embodiments 2-52,
wherein the biotic filament insulation medium is flexible.

Embodiment 54. The method according to any of embodiments 2-53,
wherein the biotic filament insulation medium is semi-rigid.

Embodiment 55. The method according to any of embodiments 2-54,
wherein the biotic filament insulation medium is positioned around the payload in a pouch or envelope configuration.

Embodiment 56. The method according to any of embodiments 2-55,
wherein the biotic filament insulation medium is incorporated inside or outside of the packaging container either permanently or temporarily.

Embodiment 57. The method according to any of embodiments 2-56,
wherein the biotic filament insulation medium is positioned on one side of the payload.

Embodiment 58. The method according to any of embodiments 2-57,
wherein the biotic filament insulation medium is positioned on all sides of the payload.

Embodiment 59. The method according to any of embodiments 2-58,
wherein the biotic filament insulation medium fully or partially surrounds, or is incorporated inside, a pallet load either permanently or temporarily.

Embodiment 60. The method according to any of embodiments 2-59,
wherein the biotic filament insulation medium fully or partially surrounds, or is incorporated inside, a unit load device either permanently or temporarily.

Embodiment 61. The method according to any of embodiments 2-60,
wherein the biotic filament insulation medium can be combined with other biotic insulation medium or non-biotic insulation medium in order to achieve a wider range of thermal and mechanical properties Embodiment 62. The method according to any of embodiments 2-61,
wherein the biotic filament insulation medium can be combined with other biotic non-biotic insulation medium in order to reduce environmental impacts.

Embodiment 63. The method according to any of embodiments 2-62,
wherein the filaments of the biotic filament insulation medium are coated fully or partially with a fire retardant.

Embodiment 64. The method according to any of embodiments 2-63,
wherein the biotic filament insulation medium has imbedded seeds to use as garden mat.

Embodiment 65. The method according to any of embodiments 2-64,
wherein the biotic filament insulation medium has a compost accelerator or activator embedded to promote rapid composting.

Embodiment 66. The method according to any of embodiments 2-65,
wherein the biotic filament insulation medium includes a fragrance.

Embodiment 67. The method according to any of embodiments 2-66,
wherein the biotic filament insulation medium has an anti-microbial and/or anti-bacterial additive.

Embodiment 68. The method according to any of embodiments 2-67,
wherein the biotic filament insulation medium is under a vacuum.

Embodiment 69. The method according to any of embodiments 2-68,
wherein at least a portion of the biotic filament insulation medium facing toward the outer surface of the container has an effective thermal effusivity of less than 125 $W\text{-}s^{1/2}/m^2\text{-}K$.

Embodiment 70. The method according to any of embodiments 2-69,
wherein the biotic filament insulation medium has a thickness in the range of 5 mm to 300 mm, 20 mm to 65 mm, and/or 5 mm to 102 mm.

Embodiment 71. The method according to any of embodiments 2-70,
wherein the biotic filament insulation medium has a non-woven structure that is fully or partially encapsulated between portions of the mechanical structure, wherein the portions of the mechanical structure are rigid, non-rigid, porous, non porous, permeable, and/or non permeable.

Embodiment 72. The method according to embodiment 71,
wherein the portions of the mechanical structure are made of paper and/or plastic.

Embodiment 73. The method according to embodiment 71,
wherein the portions of the mechanical structure are rigid, non-rigid, porous, non porous, permeable, and/or non-permeable.

Embodiment 74. The method accordingly to any of the preceding embodiments,
wherein the payload is maintained within the desired temperature range when the packaging container, with the biotic material, is positioned in the surrounding environment having a temperature/time profile in accordance with the ISTA 7E and/or the ISTA 7D temperature/time profile(s).

Embodiment 75. The method according to any preceding embodiment,
wherein the gas mixture is air.

Embodiment 76. A method of providing a thermal environment to a payload transported and/or stored in a surrounding environment, comprising:
providing a pallet;
providing a biotic material insulation medium,
wherein the biotic material insulation medium comprises a plurality of particles of biotic material having voids between the particles of the plurality of particles of biotic material, wherein the voids have a gas or gas mixture therein;
providing a mechanical structure, wherein the mechanical structure provides mechanical support to the biotic material insulation medium;
positioning a payload on the pallet,
wherein the payload has four payload sides, a payload bottom, and a payload top, and the payload bottom is on a pallet top of the pallet;
positioning:
the biotic material insulation medium with respect to the payload,
the mechanical structure with respect to the biotic material insulation medium; and
the pallet, with the biotic material insulation medium and mechanical structure, in a surrounding environment,
such that the mechanical structure provides mechanical support to the biotic material insulation medium so that the biotic material insulation medium is:
between one or more payload sides of the four payload sides of the payload and the surrounding environment;
between the payload top of the payload and the surrounding environment; and/or
between the payload bottom of the payload and the surrounding environment, and the biotic material insulation medium surrounds at least 50% of the payload; and
wherein the surrounding environment has a surrounding temperature that is (i) above, or (ii) below, respectively, a desired temperature range; and
wherein, when the pallet, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment through the biotic material insulation medium and mechanical structure, or (ii) reduces a rate at which the payload dissipates heat that transfers through the biotic material insulation medium and mechanical structure into the surrounding environment.

Embodiment 77. The method according to embodiment 76,
wherein the biotic material insulation medium is:
between the four payload sides of the payload and the surrounding environment; and
between the payload top of the payload and the surrounding environment.

Embodiment 78. The method according to embodiment 76,
wherein the biotic material insulation medium is:
between the four payload sides of the payload and the surrounding environment;
between the payload top of the payload and the surrounding environment; and
between the payload bottom of the payload and the surrounding environment.

Embodiment 79. The method accordingly to embodiment 76,
wherein the payload is maintained within the desired temperature range when the pallet, with the biotic material, is positioned in the surrounding environment having a temperature/time profile in accordance with the ISTA 7E and/or the ISTA 7E temperature/time profile(s).

Embodiment 80. The method according to any of embodiments 76 to 79,
wherein the gas mixture is air.

Embodiment 81. A packaging container assembly, comprising:
a packaging container having an inner surface and an outer surface, wherein the inner surface defines an interior of the container;
a biotic material insulation medium,
wherein the biotic material insulation medium comprises a plurality of particles of biotic material having voids between the particles of the plurality of particles of biotic material, wherein the voids have a gas or gas mixture therein;

a mechanical structure;

wherein the packaging container assembly is configured to position a payload in the interior of the packaging container;

wherein the biotic material insulation medium is positioned with respect to the payload such that the biotic material insulation medium is between at least a portion of the payload and the outer surface of the container;

wherein the mechanical structure is positioned with respect to the biotic material insulation medium such that the mechanical structure provides mechanical support to the biotic material insulation medium so that the biotic material insulation medium surrounds at least 50% of the payload; and wherein the packaging container, with the biotic material insulation medium and mechanical structure, is configured to be positioned in a surrounding environment, wherein the surrounding environment has a surrounding temperature that is (i) above, or (ii) below, respectively, a desired temperature range; and wherein, when the packaging container, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment into the interior of the packaging container, or (ii) reduces a rate at which the payload dissipates heat that transfers from into the interior of the packaging container into the surrounding environment.

Embodiment 82. The assembly according to embodiment 81, wherein the plurality of particles of biotic material is a plurality of filaments of biotic material, and the biotic material insulation medium is a biotic filament insulation medium.

Embodiment 83. The assembly according to embodiment 82, wherein the plurality of filaments of biotic material is:
a plurality of filaments of woody biotic material;
a plurality of filaments of bryophyte biotic material; and/or
a plurality of filaments of herbaceous biotic material; and/or
a plurality of filaments of fungi biotic material.

Embodiment 84. The assembly according to any of embodiments 82-83, wherein the filaments of biotic material are derived from a renewable resource that has been nominally modified from its natural structure, and naturally biodegrades and decomposes.

Embodiment 85. The assembly according to any of embodiments 82-84, wherein producing the filaments of biotic material from the renewable resource require no, or an inconsequential amount of water, to produce, utilizes minimal energy, and does not use unnatural products and pesticides.

Embodiment 86. The assembly according to any of embodiments 82-85, wherein at least a portion of the biotic filament insulation medium has an apparent bulk density in a range from 20 kg/m$^3$ to 140 kg/m$^3$.

Embodiment 87. The assembly according to any of embodiments 82-86, wherein at least a portion of the biotic filament insulation medium has an apparent bulk density in a range from 25 kg/m$^3$ to 90 kg/m$^3$, from 25 kg/m$^3$ to 70 kg/m$^3$, from 35 kg/m$^3$ to 80 kg/m$^3$, and/or from 45 kg/m$^3$ to 55 kg/m$^3$.

Embodiment 88. The assembly according to any of embodiments 82-87, wherein the filaments of biotic material of the plurality of filaments of biotic material have a density ranging from 96 kg/m$^3$ to 960 kg/m$^3$, from 150 kg/m$^3$ to 170 kg/m$^3$, from 400 kg/m$^3$ to 440 kg/m$^3$, and/or from 150 kg/m$^3$ to 450 kg/m$^3$.

Embodiment 89. The assembly according to any of embodiments 82-88, wherein the plurality of filaments of biotic material is a plurality of filaments of woody biotic material, wherein each filament of woody biotic material of the plurality of filaments of woody biotic material has a modulus of elasticity ranging from 500 kg/mm$^2$ to 1600 kg/mm$^2$.

Embodiment 90. The assembly according to embodiment 89, wherein each filament of woody biotic material of the plurality of filaments of woody biotic material has a modulus of rupture ranging from 4 kg/mm$^2$ to 14 kg/mm$^2$.

Embodiment 91. The assembly according to any of embodiments 82-90, wherein the biotic filament insulation medium has an apparent porosity of at least 0.5. at least 0.6. at least 0.65, at least 0.7, at least 0.75, at least 0.8, and/or at least 0.85.

Embodiment 92. The assembly according to any of embodiments 82-91, wherein the biotic filament insulation medium has an apparent porosity of at least 0.8.

Embodiment 93. The assembly according to any of embodiments 82-92, wherein at least 10% of the voids between the filaments of the biotic filament insulation medium are larger than 1 cubic millimeter.

Embodiment 94. The assembly according to any of embodiments 82-93, wherein the desired temperature range is 2-8° C., 20-25° C., 0-5° C., 2-4° C., 10-15° C., 15-30° C., 2-30° C., −40-30° C., or below −18° C.

Embodiment 95. The assembly according to any of embodiments 82-94, wherein the biotic filament insulation medium consists of filaments of a single type of biotic material or comprises filaments of a plurality of types of biotic materials.

Embodiment 96. The assembly according to any of embodiments 82-95, wherein the filaments of the plurality of filaments of biotic material have an overall tortuosity greater than 1.0.

Embodiment 97. The assembly according to any of embodiments 82-96, wherein the plurality of filaments of biotic material is moss.

Embodiment 98. The assembly according to any of embodiments 82-97, wherein the plurality of filaments of biotic material is aspen and/or great lakes aspen.

Embodiment 99. The assembly according to any of embodiments 82-98,
  wherein the plurality of filaments of biotic material is wood.
Embodiment 100. The assembly according to any of embodiments 82-99,
  wherein a first portion of the filaments of the plurality of filaments of biotic material are moss and the remaining filaments of the plurality of filaments of biotic material are wood.
Embodiment 101. The assembly according to any of embodiments 82-100,
  wherein the filaments of the plurality of filaments of biotic material are dried by solar drying process.
Embodiment 102. The assembly according to any of embodiments 82-101,
  wherein the plurality of filaments of biotic material is compostable in accordance with the ASTM D6400, ASTM D5338, EN 13432:2000, and/or EN 14995:2006 plastic composting standards.
Embodiment $10^3$. The assembly according to any of embodiments 82-102,
  wherein the biotic filament insulation medium is compostable in accordance with the ASTM D6400, ASTM D5338, EN 13432:2000, and/or EN 14995:2006 plastic composting standards.
Embodiment 104. The assembly according to any of embodiments 82-$10^3$,
  wherein the biotic material insulation medium has a thermal conductivity in the range from 0.015 to 0.3 W/m-K and/or from 0.015 to 0.08 W/m-K.
Embodiment 105. The assembly according to any of embodiments 82-104,
  wherein at least a portion of the biotic filament insulation medium facing toward the outer surface of the container has an effective thermal effusivity of less than 125 W-svm/m$^2$-K.
Embodiment 106. The assembly according to any of embodiments 82-105,
  wherein the biotic material insulation medium has an R-value for a thickness of 25.=0.4 mm (1 inch) in the range 0.35 to 0.88 m$^2$K/W for an apparent bulk density in the range 25 to 120 kg/m$^2$.
Embodiment 107. The assembly according to any of embodiments 82-106,
  wherein at least 10% of the filaments of the plurality of filaments of biotic material are longer than 15 mm.
Embodiment 108. The assembly according to any of embodiments 82-107,
  wherein at least 80% of the filaments of the plurality of filaments of biotic material are longer than 3.0 inches.
Embodiment 109. The assembly according to any of embodiments 82-108.
  wherein the filaments of the plurality of filaments of biotic material are irregular shaped and/or do not have a smooth surface.
Embodiment 110. The assembly according to any of embodiments 82-109,
  wherein the filaments of the plurality of filaments of biotic material have a cross-sectional shape selected from the group consisting of: rectangular, round, triangular, square, flat, spherical, polyhedron, and tubular.
Embodiment 111. The assembly according to any of embodiments 82-110,
  wherein the voids reduce heat transfer by conduction to or from the payload.
Embodiment 112. The assembly according to any of embodiments 82-111,
  wherein the biotic filament insulation medium comprises loose materials between portions of the mechanical structure.
Embodiment 113. The assembly according to embodiment 112,
  wherein the portions of the mechanical structure are made of paper and/or plastic.
Embodiment 114. The assembly according to any of embodiments 82-113,
  wherein the biotic filament insulation medium allows gas and water vapor exchange.
Embodiment 115. The assembly according to any of embodiments 82-114,
  wherein the biotic filament insulation medium has a permeance for oxygen of at least $15.6 \times 10^3$ $L_{O2}$/(m$^2$ atm d).
Embodiment 116. The assembly according to any of embodiments 82-115,
  wherein the biotic filament insulation medium has a permeance for carbon dioxide of at least $23.4 \times 10^3$ $L_{CO2}$/(m$^2$ atm d).
Embodiment 117. The assembly according to any of embodiments 82-116,
  wherein the biotic filament insulation medium has a permeance for water vapor of at least $1 \times 10^3 g_{water}$/(m$^2$ atm d)
Embodiment 118. The assembly according to any of embodiments 82-117,
  wherein the biotic filament insulation medium is a non-woven structure in the form of a mat, pad, pouch, liner, envelope, or cover.
Embodiment 119. The assembly according to any of embodiments 82-118,
  wherein the biotic filament insulation medium has an apparent porosity of at least 50% and/or at least 70%, where the voids are filled by argon or helium.
Embodiment 120. The assembly according to any of embodiments 82-119,
  wherein the biotic filament insulation medium has an apparent porosity of at least 50% at and/or least 70%, where the voids are filled by air.
Embodiment 121. The assembly according to any of embodiments 82-120,
  wherein the biotic filament insulation medium surrounds essentially 100% of the payload.
Embodiment 122. The assembly according to any of embodiments 82-121,
  wherein the biotic filament insulation medium surrounds at least 90% of the payload.
Embodiment 123. The assembly according to any of embodiments 82-122,
  wherein the biotic filament insulation medium can absorb liquids when in contact with liquids or by vapor transmission.
Embodiment 124. The assembly according to any of embodiments 82-123,
  wherein the biotic filament insulation medium can absorb at least 100%, at least 200%, and/or at least 300% of its weight in liquids.
Embodiment 125. The assembly according to any of embodiments 82-124,
  wherein the biotic filament insulation medium, when absorbing liquids, which raises the thermal conductivity of the biotic filament insulation medium per unit thickness, can expand such that an effective thermal conductivity of the expanded biotic filament insulation medium is lower than the raised thermal conductivity of the biotic filament insulation medium per unit thickness.

Embodiment 126. The assembly according to any of embodiments 82-125,
wherein the biotic filament insulation medium shrinks or expands depending on a humidity level of a portion of the interior of the container the biotic filament insulation medium is exposed to and absorption of water into the filaments of the biotic filament insulation medium, or evaporation of water out of the filaments of the biotic filament insulation medium.

Embodiment 127. The assembly according to any of embodiments 82-126,
wherein the biotic filament insulation medium can be compressed by compressive pressure to less than 90% of its initial thickness and recover some of its thickness after the compressive pressure is released.

Embodiment 128. The assembly according to any of embodiments 82-127,
wherein the biotic filament insulation medium can be compressed by compressive pressure to less than 50% of its initial thickness and recover some of its thickness after the compressive pressure is released.

Embodiment 129. The assembly according to any of embodiments 82-128,
wherein the filaments of the biotic filament insulation medium have a water content of 22% to 25%, 18% to 22%, and/or 19% to 21%.

Embodiment 130. The assembly according to any of embodiments 82-129,
wherein the filaments of the biotic filament insulation medium are flexible.

Embodiment 131. The assembly according to any of embodiments 82-130,
wherein the filaments of the biotic filament insulation medium have a water content of 10% to 35%.

Embodiment 132. The assembly according to any of embodiments 82-131,
wherein the filaments of the biotic filament insulation medium are semi-rigid.

Embodiment 133. The assembly according to any of embodiments 82-132,
wherein the biotic filament insulation medium is flexible.

Embodiment 134. The assembly according to any of embodiments 82-133,
wherein the biotic filament insulation medium is semi-rigid.

Embodiment 135. The assembly according to any of embodiments 82-134,
wherein the biotic filament insulation medium is positioned around the payload in a pouch or envelope configuration.

Embodiment 136. The assembly according to any of embodiments 82-135,
wherein the biotic filament insulation medium is incorporated inside or outside of the packaging container either permanently or temporarily.

Embodiment 137. The assembly according to any of embodiments 82-136,
wherein the biotic filament insulation medium is positioned on one side of the payload.

Embodiment 138. The assembly according to any of embodiments 82-137,
wherein the biotic filament insulation medium is positioned on all sides of the payload.

Embodiment 139. The assembly according to any of embodiments 82-138,
wherein the biotic filament insulation medium fully or partially surrounds, or is incorporated inside, a pallet load either permanently or temporarily.

Embodiment 140. The assembly according to any of embodiments 82-139,
wherein the biotic filament insulation medium fully or partially surrounds, or is incorporated inside, a unit load device either permanently or temporarily.

Embodiment 141. The assembly according to any of embodiments 82-140,
wherein the biotic filament insulation medium can be combined with other biotic insulation medium or non-biotic insulation medium in order to achieve a wider range of thermal and mechanical properties Embodiment 142. The assembly according to any of embodiments 82-141,
wherein the biotic filament insulation medium can be combined with other biotic non-biotic insulation medium in order to reduce environmental impacts.

Embodiment 143. The assembly according to any of embodiments 82-142,
wherein the filaments of the biotic filament insulation medium are coated fully or partially with a fire retardant.

Embodiment 144. The assembly according to any of embodiments 82-143,
wherein the biotic filament insulation medium has imbedded seeds to use as garden mat.

Embodiment 145. The assembly according to any of embodiments 82-144,
wherein the biotic filament insulation medium has a compost accelerator or activator embedded to promote rapid composting.

Embodiment 146. The assembly according to any of embodiments 82-145,
wherein the biotic filament insulation medium includes a fragrance.

Embodiment 147. The assembly according to any of embodiments 82-146,
wherein the biotic filament insulation medium has an anti-microbial and/or anti-bacterial additive.

Embodiment 148. The assembly according to any of embodiments 82-147,
wherein the biotic filament insulation medium is under a vacuum.

Embodiment 149. The assembly according to any of embodiments 82-148,
wherein at least a portion of the biotic filament insulation medium facing toward the outer surface of the container has an effective thermal effusivity of less than 125 $W\text{-}s^{1/2}/m^2\text{-}K$.

Embodiment 150. The assembly according to any of embodiments 82-149,
wherein the biotic filament insulation medium has a thickness in the range of 5 mm to 300 mm, 20 mm to 65 mm, and/or 5 mm to 102 mm.

Embodiment 151. The assembly according to any of embodiments 82-150,
wherein the biotic filament insulation medium has a non-woven structure that is fully or partially encapsulated between portions of the mechanical structure, wherein the portions of the mechanical structure are rigid, non-rigid, porous, non porous, permeable, and/or non permeable.

Embodiment 152. The assembly according to embodiment 151,
wherein the portions of the mechanical structure are made of paper and/or plastic.

Embodiment 153. The assembly according to embodiment 151,
wherein the portions of the mechanical structure are rigid, non-rigid, porous, non porous, permeable, and/or non-permeable.

Embodiment 154. The assembly accordingly to any of embodiments 82-153,
wherein the payload is maintained within the desired temperature range when the packaging container, with the biotic material, is positioned in the surrounding environment having a temperature/time profile in accordance with the ISTA 7E and/or the ISTA 7D temperature/time profile(s).

Embodiment 155. The assembly according to any preceding embodiment,
wherein the gas mixture is air.

Embodiment 156. A pallet covering system, comprising:
a biotic material insulation medium,
wherein the biotic material insulation medium comprises a plurality of particles of biotic material having voids between the particles of the plurality of particles of biotic material, wherein the voids have a gas or gas mixture therein;
a mechanical structure, wherein the mechanical structure provides mechanical support to the biotic material insulation medium;
wherein the system is configured to position:
the biotic material insulation medium with respect to a payload on a pallet, wherein the payload has four payload sides, a payload bottom, and a payload top, and the payload bottom is on a pallet top of the pallet, wherein the pallet, with the biotic material insulation medium and mechanical structure, is positioned in a surrounding environment; and
the mechanical structure with respect to the biotic material insulation medium, such that the mechanical structure provides mechanical support to the biotic material insulation medium so that the biotic material insulation medium is:
between one or more payload sides of the four payload sides of the payload and the surrounding environment;
between the payload top of the payload and the surrounding environment; and/or
between the payload bottom of the payload and the surrounding environment, and the biotic material insulation medium surrounds at least 50% of the payload; and
wherein the surrounding environment has a surrounding temperature that is (i) above, or (ii) below, respectively, a desired temperature range; and
wherein, when the pallet, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment through the biotic material insulation medium and mechanical structure, or (ii) reduces a rate at which the payload dissipates heat that transfers through the biotic material insulation medium and mechanical structure into the surrounding environment.

Embodiment 157. The system according to embodiment 156,
wherein the biotic material insulation medium is:
between the four payload sides of the payload and the surrounding environment; and
between the payload top of the payload and the surrounding environment.

Embodiment 158. The system according to embodiment 156,
wherein the biotic material insulation medium is:
between the four payload sides of the payload and the surrounding environment;
between the payload top of the payload and the surrounding environment; and
between the payload bottom of the payload and the surrounding environment.

Embodiment 159. The system accordingly to embodiment 156,
wherein the payload is maintained within the desired temperature range when the pallet, with the biotic material, is positioned in the surrounding environment having a temperature/time profile in accordance with the ISTA 7E and/or the ISTA 7E temperature/time profile(s).

Embodiment 160. The system according to any of embodiments 156 to 159,
wherein the gas mixture is air.

DETAILED DISCLOSURE

Biotic materials are bio-based and compostable, and are healthy, renewable nutrients to the ecosystem. Under a managed composting program in accordance with ASTM D6400 composting standards set by the American Society for Testing and Materials, a compostable product must: (1) break down to carbon dioxide, water, inorganic compounds, and biomass at a rate similar to paper, (2) disintegrate into small pieces within 90 days, so that the original product is not visually distinguishable in the compost, and (3) leave no toxic residue. Embodiments of the subject invention relate to a compostable product, such as a BMS, or an insulating container incorporating a BMIM, that meets composting standards such as the ASTM D6400 composting standards, the ASTM D5338 composting standards, the EN 13432: 2000 packaging composting standards, and/or the EN 14995:2006 plastics composting standards.

Most of the insulation materials currently available in the industry are considered biodegradable, which means these insulation materials are capable of disintegration by biological means. Technically, a biodegradable product can be composed of almost any material, since after enough time, some microorganisms can decompose almost anything. As an example, aluminum cans will biodegrade in the ocean after about 175 years, and plastic, such as expanded polystyrene, will biodegrade in the ocean after about 400 years.

In order to provide insulation materials that are truly in the scope of an environmentally friendly solution, embodiments of the invention utilize one or more biotic materials that have been produced by mechanically and/or hydrationally modifying one or more raw biotic materials from the biotic materials' natural structures. A biotic material is any material that originates from a living organism. Such a material contains carbon and is capable of decay. Specific biotic materials used in accordance with embodiments of the invention are considered "biotic primary raw materials," as these biotic materials use the natural form of raw biotic materials with no, or negligible, physical transformation of the natural form of the biotic materials' natural structure (e.g., with only mechanical and/or hydrational modification). As an example, sphagnum moss can be used as a biotic material for insulation in accordance with an embodiment of the invention, after drying (i.e., dehydrating) the sphagnum moss, such that the dehydrated sphagnum moss retains the natural structure of the natural form of the sphagnum moss. Dehydration of the sphagnum moss can be accomplished by drying the sphagnum moss in the sun for many days prior to use in embodiments of the subject invention. Biotic materials that can be used in accordance with specific embodiments of the subject invention include: woody biotic materials, bryophyte biotic materials, herbaceous biotic materials, fungi materials, and other similar biotic materials.

Figure 1:
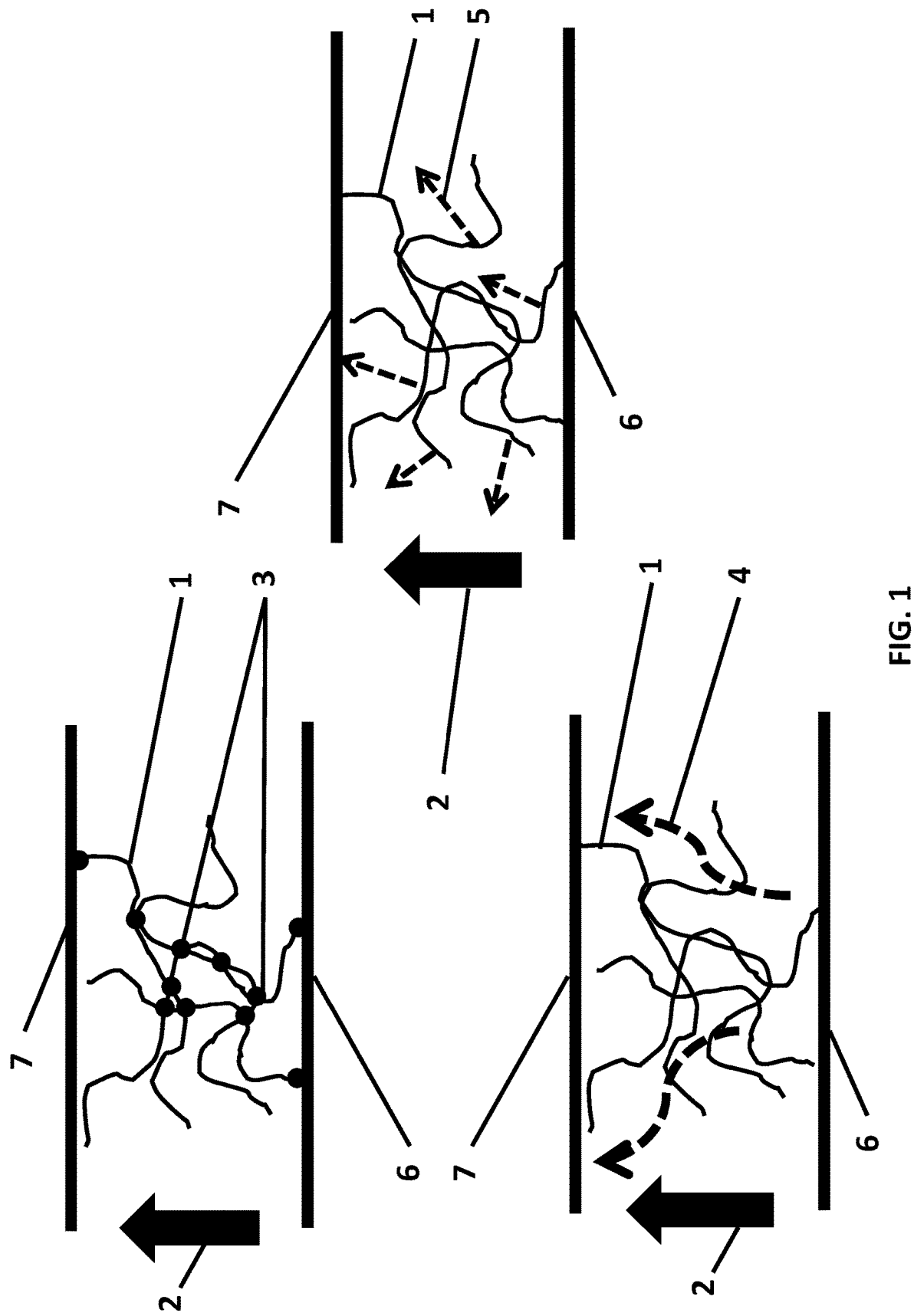
FIG. 1 shows three modes of heat transfer through a biotic material insulating structure having a plurality of filaments with voids between filaments in accordance with an embodiment of the subject invention.

Embodiments pertain to biotic material insulating structures that incorporate a plurality of pieces of one or more biotic materials that have properties that enhance thermal protection provided by the biotic material insulating structures for use in the temperature sensitive transportation industry, such as a thermal conductivity of the biotic materials, which facilitates achieving the thermal protection required by temperature sensitive transportation industry. As shown in FIG. 1, heat transfer (2) through an insulation structure incorporating a plurality of pieces of solid material having voids (e.g., air gaps) between the pieces of the solid material occurs by means of conduction, convection, and radiation, where conduction includes heat transfer along each piece of solid material (i.e., heat transfer through the piece of solid material from position A on the piece of solid material (1), such as woody biotic fiber to position B on the same piece of solid material (1) and heat transfer from a first piece of solid material to a second piece of solid material that is in direct thermal contact (3) with the first piece of solid material), while heat loss from a piece of solid material to a void (and/or heat gain by a piece of solid material from a void) occurs by means of convection and/or radiation. Heat passes along each piece of solid material (1), e.g., from position A to position B, by means of conduction, where the rate at which heat conduction through the solid material occurs depends on the thermal conductivity of the piece of solid material, the cross-sectional shape of the piece of solid material, the path from A to B, and the temperature drive (i.e., the temperature gradient from position A to position B). In general, the greater the density of a solid material, the greater the thermal conductivity of the solid material. As an example, metals have a high density and a high thermal conductivity.

A material insulation medium (e.g., an ensemble of multiple pieces of solid material having voids between the pieces of solid material) that has a high proportion of voids between the pieces of solid material, where the voids contain a gas or gas mixture, such as air, typically have a low thermal conductivity, where the proportion of voids refers to the proportion of the volume the material insulating medium occupies that is voids. A material insulation medium can be configured to achieve a desired (effective) thermal conductivity for the material insulating medium by controlling the shape, size, cross-sectional shape, and solid material of the plurality of pieces of solid material, controlling the size, shape, distribution, and/or proportion of voids in the material insulating medium, as well as controlling the gas and/or gas mixture filling the voids. In addition, altering the moisture content of solid materials that can have a range of moisture content can alter the effective thermal conductivity of the material insulation medium incorporating the plurality of pieces of solid material. Referring to FIG. 1, the size and shape of voids in the insulating structure can be optimized so the voids limit the transmission of heat by convection and/or radiation (e.g., by introducing, decreasing the size of, or increasing the size of, voids so the voids are big enough, and numerous enough, to limit substantial transmission of heat through the material insulation medium by conduction, and the voids are small enough to reduce heat transfer through the material insulation medium that involves heat transfer from the solid material to a void, or from a void to the solid material, via natural convection (4) and/or radiation (5)), and, therefore, reduce the flow of heat from a first surface (6) (at a temperature T1) to a second surface (7) (at a temperature T2) of the material insulation medium (i.e., reduce the effective thermal conductivity of the material insulation medium) (Babu et al., 2015). Material insulation mediums, e.g., insulation structures, used for thermal insulation typically fall into this latter category.

Embodiments of the invention provide a biotic material insulation medium that is at least 85%, at least 90%, at least 95%, at least 96%, at least 97%, at least 98%, at least 99%, and/or 100% compostable (e.g., meets the ASTM D6400, ASTM D5338, EN 13432:2000, and/or EN 14995:2006 plastic composting standards), which can be positioned with respect to products during shipping, distribution, and/or storage, in order to control the temperature, and/or control the temperature as a function of time, that the products experience, for various external temperatures and/or conditions to which shipped products are exposed (e.g., the temperature of the surrounding environment an insulating packaging container the product is packaged within is positioned in). Specific embodiments relate to a method of using such a biotic material insulation medium in the shipping, distribution, and/or storage of products that are required to be maintained in a specific temperature range during shipping, distribution, and/or storage.

Thermal properties of the "biotic material insulation medium" meeting one or more criteria are achieved by using select types of biotic materials, pieces of biotic material having select structures, shapes, humidity, and/or other characteristics, and assembling the pieces of biotic material in a way so as to create a biotic material insulation medium that has a high proportion of voids containing a gas and/or gas mixture, such as air, and a density distribution of the biotic material (i.e., solid material) that meets one or more additional criteria. The assembly of the plurality of pieces of biotic material into a biotic material structure, and the proportions of the volume of the biotic material and the volume of voids between the biotic material, where the biotic material structure having the voids filled with a gas or gas mixture is used to form the subject biotic material insulation medium having an effective thermal conductivity, such that an insulating structure incorporating the BMIM achieves a level of effective thermal conductivity that provides the thermal protection required for insulation shipping containers (e.g., insulating packaging container assemblies).

Figure 2:
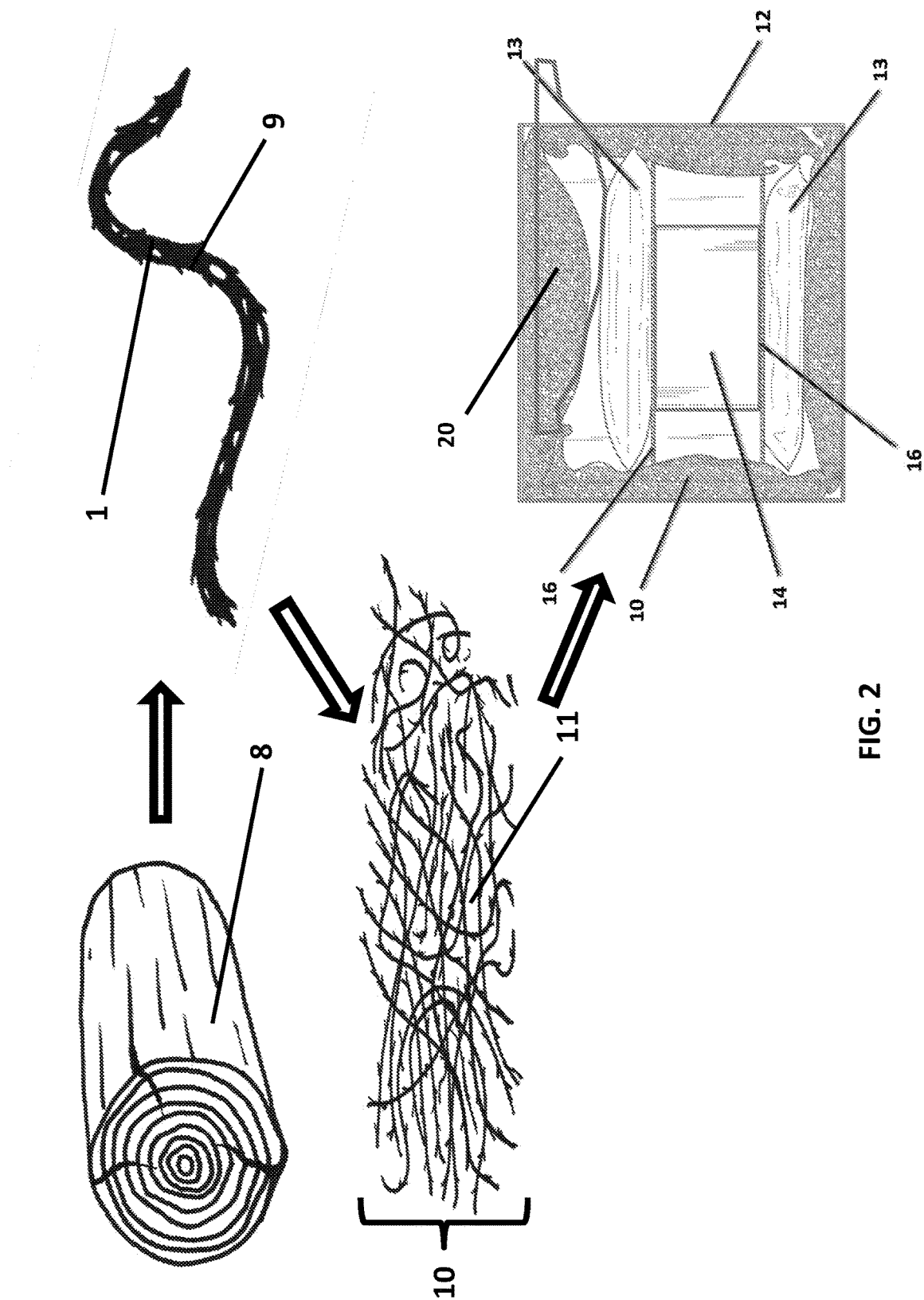
FIG. 2 shows a manufacturing process in accordance with an embodiment of the subject invention for producing a woody biotic material insulating shipping container in accordance with an embodiment of the subject invention.

FIG. 2 shows an embodiment of a process to build an insulation shipping (packaging) container that can be incorporated into an insulating packaging container assembly (shown in FIG. 2 and FIG. 3), for use with perishable products using a cold bank. The process starts using a source of wood, such as a wood log (1), such as aspen and/or great lakes aspen, dried to a moisture content in the range 18-22%, 19-21%, 20-22%, 21-22%, 21-23%, 20-24%, 19-25%, 18-26%, 17-27%, 16-28%, and/or 15-29%, and preferably about 20%. The log (8) is shredded into woody biotic filaments (1) of various dimensions and shapes depending on the shape of the shredder blade, the angle the shredder blade makes to the surface of the log, the speed the blade passes over the log, and other parameters that can be varied. Specific embodiments use a process that is currently used to produce commercially available wood wool. The woody filaments are characterized by a specific density that inherently takes into account the internal pores (9) in the wood from the nature of the type of wood used. The produced filaments are stacked and pressed together, e.g., between two plates applying a certain pressure based on the amount of filaments positioned between the plates and the thickness to be achieved, in order to produce woody biotic material structure (10) (see FIG. 4, where the top biotic material structure is made of a woody biotic material and the bottom biotic material structure is made of a bryophyte biotic material) that has a desired thickness and a specific amount and shapes of voids (11) between of the filaments. The biotic material structure, with a gas and/or gas mixture filling the voids, is placed between walls of the a shipping (packaging) container, e.g., corrugated cardboard walls (12), and positioned with walls of a lid (20) made the same way. A cold bank made of two ice packs (13) separated by two corrugated sheets (16) from the payload (14) can then be placed within the container.

An embodiment of a "biotic material insulation medium" in accordance with the invention has a non-woven biotic material structure composed of filaments of a biotic material ("biotic filaments"), and has a high proportion of voids the filaments containing a gas and/or gas mixture, such as air, filling the voids in the biotic material structure. In specific embodiments, these biotic filaments can be: (a) threadlike wood, such as incorporated in wood wool or *excelsior*, (b) fibers or fibrils of a plant material, such as sphagnum moss, and/or (c) portions of a stalk of a plant or other types of filaments found in herbaceous plants. In specific embodiments, wood wool, *excelsior*, sphagnum moss, or a combination thereof can be used in the biotic material insulation medium.

Embodiments incorporate biotic filaments having a shape similar to a random three-dimensional shape (see FIG. 5) in order to promote interlocking between the filaments. The quality of the interlocking determines the mechanical strength, stiffness and thermal properties of the biotic material insulation medium formed by the biotic filaments. Even though it is difficult to quantify the physical shape of a biotic filament, it is possible to use the tortuosity of the filament to quantify the physical shape of a biotic filament. Tortuosity is a property of a curve being tortuous (twisted; having many turns). There have been several attempts to quantify this property. Tortuosity is commonly used to describe diffusion in porous media, but can be also applied in the case of biotic filaments as reported by Geiselmann et al. (2013). The simplest mathematical method to estimate tortuosity is the ratio of the actual distance traveled between two points, including any curves encountered, divided by the straight line distance. Embodiments of the subject filaments can have a tortuosity greater than 1.0 in one dimension, two dimensions, or three dimensions, depending on the process used to produce the filaments, such as the shredding process of the wood used to produce the filaments. In a preferred embodiment, the biotic filament has a tortuosity greater than 1.0 in all three dimensions in order to create a desirable biotic filament insulation medium. The overall three dimensional tortuosity of a biotic filament is expressed as following:

$$T_{overall}=T(x)*T(y)*T(z)$$

The followings are measurements done on woody biotic filaments:

| Filament | Length x | (mm) xt | Length y | (mm) yt | Length z | (mm) zt | Tortuosity Tx | Ty | Tz | Overall Tortuosity |
|---|---|---|---|---|---|---|---|---|---|---|
| 1 | 140 | 171 | 30 | 52 | 12 | 18 | 1.22 | 1.73 | 1.50 | 3.18 |
| 2 | 153 | 194 | 36 | 39 | 7 | 23 | 1.27 | 1.08 | 3.29 | 4.51 |
| 3 | 92 | 118 | 16 | 17 | 3 | 5 | 1.28 | 1.06 | 1.67 | 2.27 |
| 4 | 142 | 159 | 43 | 84 | 4 | 9 | 1.12 | 1.95 | 2.25 | 4.92 |
| 5 | 76 | 108 | 28 | 51 | 9 | 15 | 1.42 | 1.82 | 1.67 | 4.31 |

The thermal insulation performance of a biotic material insulating medium formed with biotic filaments, (i.e., "biotic filament insulation medium") in accordance with the invention is accomplished by achieving physical properties, such as apparent bulk density, apparent porosity, moisture content, effective thermal conductivity, effective thermal effusivity, and compressibility, that meet one or more respective criteria.

The apparent bulk density of the biotic filament insulation medium is defined as the mass of the many particles of the solid material (i.e., the mass of the plurality of filaments) divided by the volume of the biotic filament insulation medium. The volume of the biotic filament insulation medium includes the particle volume (i.e., the summation of the volumes of the biotic filaments) and the inter-particle void volume (i.e., the summation of the volumes of all of the voids between the biotic filaments). In the case of a "biotic filament insulation medium," the apparent bulk density is the mass of the biotic filaments divided by the total volume that the interlocking biotic filaments occupy to create the biotic filament insulation medium, such as the volume of the interior of an insulation pad incorporating the biotic filament insulation medium in the interior of the insulation pad.

Specific embodiments can utilize wood excelsior produced by American Excelsior Company, Wood Fibers Division, in accordance with the Material Specifications for Excelsior package pads ("wood excelsior by AEC"), using Great Lakes Aspen ("wood excelsior by AEC"), where the wood excelsior by AEC need not be part of the excelsior package pad described therein.

The biotic material package pads made of wood excelsior fibers, such as the wood excelsior by AEC used therein, have the following physical properties:
Fiber: Great Lakes Aspen
   Curled, interlocking fibers with barbed edges
Fiber Size: 80% of fibers≥6.0" (15.2 cm) long
   0.018"±0.003"×0.038"+0.008"
   (0.46 mm±0.08 mm×0.97 mm±020 mm)
Weight±10% @ 22% moisture and
Water absorption of 250%±25%
Paper: 30 #Kraft
Paper Configuration: Totally encased Another embodiment can be achieved by modifying these biotic material package pads made of wood excelsior fibers, by increasing the fiber size of the embodiment above such that 80% of fibers are greater than or equal to 3.0" (0.076 m) long.

The wood excelsior by AEC can also undergo additional processing prior to use in embodiments of the subject application. In a specific embodiment, the wood excelsior by AEC is dried to a moisture content of 9-14%, 15-20%, 20-22%, 22-24%, 20-24%, 20-28%, 21-27%, 22-26%, 23-25%, and preferably about 20%. In a specific embodiment, the wood excelsior by AEC is dried via furnace, and in preferred embodiments, is dried naturally, e.g., by the sun to a moisture content of 9-14%, 15-20%, 20-22%, 22-24%, 20-24%, 20-28%, 21-27%, 22-26%, 23-25%, and preferably about 20%, rather than furnace drying, which can change the structure of the wood (e.g., make the fibers/filaments more brittle, so that the filaments retain spring (elasticity) by sun drying the filaments). Specific embodiments can compress the same amount of wood excelsior by AEC fibers/filaments as in the 0.5 inch (or 1 inch) thick pad, of known area, of the American Excelsior Company, but reduce the compressive pressure to produce a 1½ inch thick pad, of the same known area, such that the density of fibers/filaments is ⅓ (or ½) of the density in the 0.5 inch(or 1 inch) pad of the American Excelsior Company (the #of filaments counted in a volume 20 cubic inches was 456 filaments, which translates into about 41,000 wood filaments per cubic feet). In additional embodiments, any multiple (such as c, where c is a positive real number) of the amount of fibers per 1000 sq in (area of pad) (e.g., weight #lbs/1000 sq in) that is compressed to 1" thick by the American Excelsior Company can be used, and a pressure that would be needed to compress the same number of fibers per 1000 sq in (e.g., weight #lbs/1000 sq in) to 3c inches (or 3c/2 inches), such as where 3c (or 3c/2) is 1½ inch, 1¼-1¾ inch, 1¼-2 inch, 1⅛-1 1/2 inch, 1¼-1½ inch, 1½- 1¾ inch, and/or 1⅜-1⅝ inch, can be applied, resulting in a fiber/filament density that is less than the density of the American Excelsior Company pad, in the range of ⅓-⅔, in the range of ½-⅔, in the range of ⅔-¾, in the range of ⅓-0.75, and/or in the range of 0.33-0.75, in the range of 0.6-0.75, of the density of the American Excelsior Company pad.

In a specific embodiment, the BMIM can utilize woody filaments, such as great Lakes Aspen, where 80% of the woody filaments ≥3.0 inches (0.076 m) or 6.0 inches (15.2 cm) long, with woody filament cross-sectional dimensions of 0.018"±0.003"×0.038"±0.008" (0.46 mm±0.08 mm×0.97 mm±0.20 mm), with a woody filament moisture content in the range of 9-14%, 15-29%, 16-28%, 17-27%, 18-26%, 19-25%, 20-24%, 21-23%, 18-22%, 19-21%, and/or approximately 20%. The percentage of filaments≥L" can be lower or higher, such that at least 60%, at least 70%, at least 80%, and/or at least 90%, of the filaments are ≥3"; ≥4"; ≥5"; ≥6"; ≥7"; ≥8"; ≥9"; and/or ≥10".

Example 1

As an example, a BMIM composed of woody filaments (a woody biotic filament insulation medium), where 80% of the woody filaments 3.0 inches (0.076 n) long, with woody filament cross-sectional dimensions of 0.018"±0.003"× 0.038"±0.008" (0.46 mm±0.08 mm×0.97 mm±0.20 mm), with a woody filament moisture content in the range of 9-14%. 15-29%, 16-28%, 17-27%, 18-26%, 19-25%, 20-24%, 21-23%, and/or approximately 20%, can be arranged in a way to achieve a biotic material insulation medium having dimensions of 11"×29"×1" (280 mm×740 mm×25.4 mm) with a total weight of 0.55 lbs (0.25 kg), when air is filling the voids between the filaments. This total weight (mass) of the BMIM includes the weight (mass) of the filaments and the weight (mass) of the air filling the voids between the filaments (noting that one cannot weigh the filaments "by themselves" unless weighing the filaments in a vacuum). The apparent bulk density of such a biotic material insulation medium is 0.00172 lb/in³ (48 kg/m³). This biotic material insulation medium can be incorporated into an insulation pad. The thickness of an insulation pad incorporating this biotic material insulation medium can be modified in order to achieve a different apparent bulk density, while maintaining the same weight of woody biotic filaments in the biotic material insulation medium. However, changing the apparent bulk density can significantly affect the thermal performance of an insulation pad incorporating the biotic material insulation medium. The apparent bulk density provides thermal performance and physical cushioning protection of an insulation pad incorporating the biotic material insulation medium.

Example 2

Figure 3:
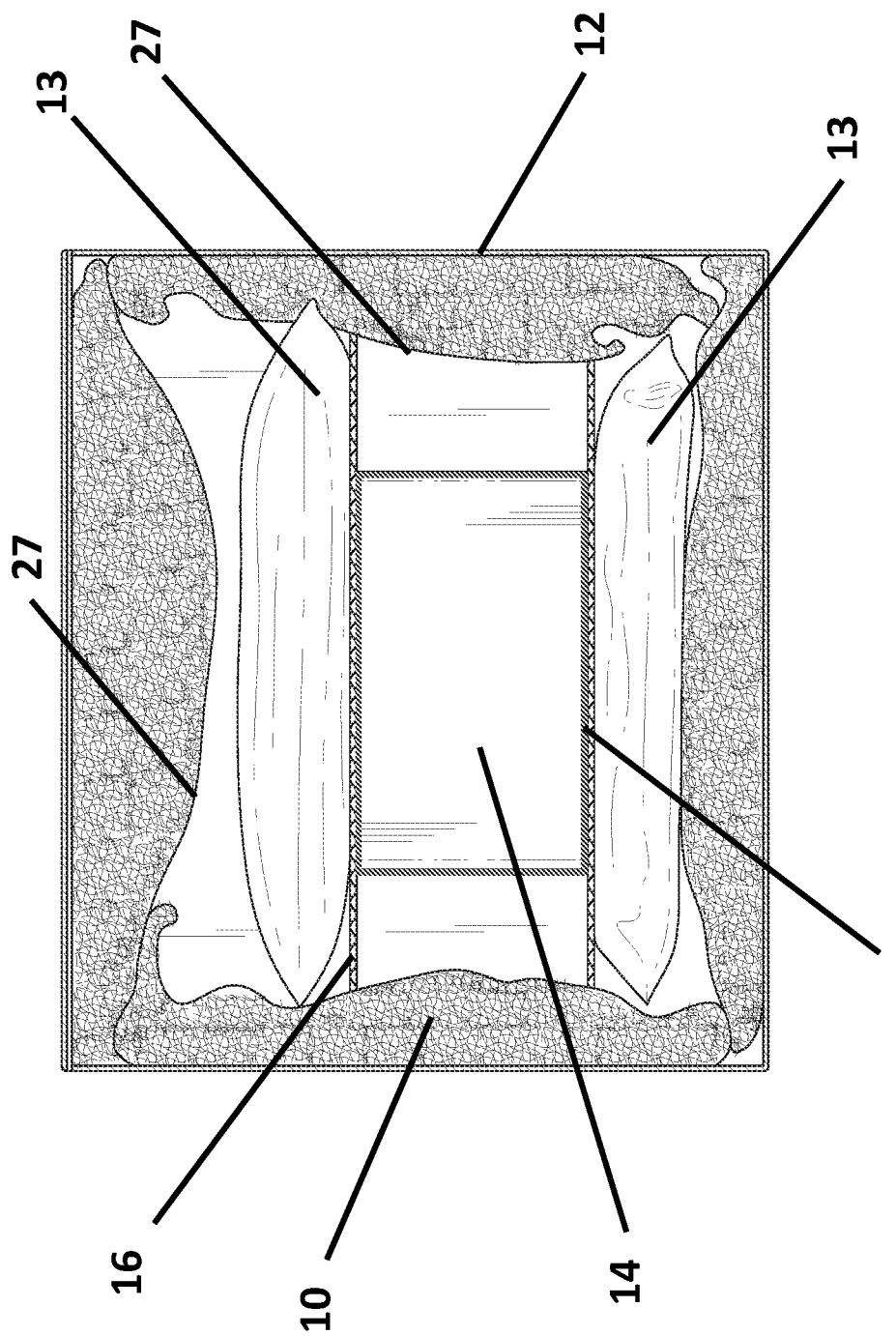
FIG. 3 shows an embodiment of an insulating packaging container assembly, incorporating an insulating packaging container in the form of a cooler, two thermal banks, and a product, in accordance with an embodiment of the subject invention.

This example, similar to the embodiment shown in FIG. 3, relates to an insulating packaging container assembly that includes a corrugated box of 9"×11"×12" with two insulation pads, incorporating the biotic material insulation medium described in Example 1, positioned within the box such that each insulation pad is placed in a U shape configuration and the two frozen gel packs (26 ounces each) are placed in the enclosed volume, as well as a payload of 20 ml (two 10-ounce vials). The goal of placing this payload in the enclosed volume of this package is to maintain the product (payload) in a thermal environment having a temperature in a range of 2-8.5° C. for 36 hours during a summer shipment, where a summer shipment may result in the insulating packaging container assembly being exposed to environmental temperatures (i.e., surrounding temperatures the assembly is positioned in) of ≥75° F., ≥80° F., ≥85° F., and/or ≥90° F., for the entire 36 hours. In specific embodiments, such a summer shipment can be exposed to temperatures following the ISTA 7E and/or ISTA 7D summer temperature/time profile(s), and/or a winter shipment can be exposed to temperatures following the ISTA 7E and/or ISTA 7D winter temperature/time profile(s). Two insulation pads having different apparent bulk densities (ABD), each incorporating a biotic material insulation medium with woody filaments, were used, where Pad #1 (48 kg/m³) described in Example 1 and Pad #2 (121 kg/m³, achieved by compacting Pad #1 from a thickness of 1.5 inches (38.1 mm) to 0.6 inch (15 mm)), such that Pad #2 has the small mass of the same filaments pressed together until the thickness of Pad #2 is 40% of the thickness of Pad #1 (resulting in the ABD of Pad #1 being 40% of the ABD of Pad #2).

TABLE 1

Effects of Apparent Bulk Density of Insulation Pad Incorporating a Biotic Material Insulation Medium With Woody Filaments

| Pad | Weight | Apparent Bulk Density | Time to reach 8.5° C. |
|---|---|---|---|
| 1 | 1.2 kg | 48 kg/m³ | 37 hours |
| 2 | 1.2 kg | 121 kg/m³ | 32 hours |

The results in Table 1 show that the package using Pad #1 was able to maintain the product temperature in the required temperature range for 37 hours, whereas the package using Pad #2 was only able to maintain the product temperature in the required temperature range for 32 hours, providing an indication that the apparent bulk density of the biotic filament insulation medium, for a given humidity, and the insulation pad incorporating the same, has a significant effect on temperature maintenance (i.e., effective thermal conductivity across the thickness of the BMIM).

The apparent bulk density is highly dependent of the apparent porosity of the biotic material insulation medium (BMIM). Interlocking biotic filaments create the BMS, which when the voids are filled with a gas or gas mixture form the biotic material insulation medium, and the manner of interlocking the biotic filaments creates the inter-particle void volume that will determine most, if not all, of the BMIM's insulation properties.

In the subject application, the biotic filaments in the BMIM are referred to as solid biotic materials even though such biotic filaments often have internal pores see (9) in FIG. 2. In this way properties of the biotic filaments (solid material) are characterized for the filament as a whole. The biotic filaments, i.e., the solid biotic material of the BMIM, can be: wood, moss or similar vegetative materials that are nominally modified from their natural structures, where vegetative materials are materials relating to, or denoting, parts of a plant, e.g., the stems, leaves, and roots. Examples of biotic materials include: wood, straw, humus, manure, bark, chitin, fungi, and fibrin. Specific examples of a solid biotic material that can be used in embodiments of the BMS (and BMIM) are aspen wood and sphagnum moss. The density of the solid biotic material (Ps) intrinsically incorporates the effects of the pores inside the solid biotic material.

The porosity of a material is the percentage of the void fraction of the material, i.e., fraction of total void volume over total volume of the material.

The apparent porosity (AP) of the biotic filament insulation medium, where the porosity of the filaments is considered zero and apparent porosity of the BMIM using filaments is the open void volume of the BMIM divided by the total volume of the BMIM, can be defined as follows:

$$AP=(Ps-Pbm)/(Ps-Po)$$

where
  Ps=density of the solid biotic material(e.g., the density of the filaments)
  Po=density of the gas and/or gas mixture (e.g., air) in the voids between the pieces of solid biotic material
  Pbm=density of the biotic material insulation medium (e.g., density of the volume in which the filaments are positioned with the gas filling the voids between the filaments), which is the sum of the weight (mass) of the filaments and the weight (mass) of the gas or gas mixture filling the voids between the filaments divided by the volume of the BMIM.

The apparent porosity of the biotic filament insulation medium will have a significant impact of the effective thermal conductivity of the biotic filament insulation medium. Characterizing the effective thermal conductivity of the biotic filament insulation medium can allow adjustments of the physical characteristics of the BMIM (e.g., biotic material; size, shape, and other properties of the biotic filaments; the number, size, and shape of the voids; and the gas or gas mixture in the voids) to enhance thermal insulation provided by the BMIM.

In addition to determining the apparent porosity of the biotic filament insulation medium by using the equation above, the filaments can be weighed in a vacuum and weighed in air, and the difference in these weights and the density of air can then be used to determine the total open volume of the voids (and hence apparent porosity of the biotic filament insulation medium (AP)). Just the same, the filaments can be weighed in air and weighed in another gas or gas mixture, such as argon, and these two weights and the difference in densities of air and argon can then used to determine the total open volume of the voids (and hence apparent porosity of the biotic filament insulation medium (AP)). The apparent porosity can also be measured by putting the biotic filament insulation medium in a container with a known volume and filling the container with water. The amount of water required to fill the voids between the filaments can be translated into the total open void volume (note, care must be taken to take measurements before the water "infiltrates" portions of the filaments, and not just the voids between the filaments, to obtain an accurate measurement). The apparent porosity could then be determined as the total open void volume divided by the total volume of the BMIM.

Using Russel's equation* for a porous medium, it is possible to use the apparent porosity to estimate the effective thermal conductivity of the biotic filament insulation medium (kbm), where Russel's equation is as follows:

$$ks/kbm = 1 - AP^{1/3} + AP^{1/3}((ko/ks)AP^{2/3} + 1 - AP^{2/3})$$

where
ks=thermal conductivity of the solid biotic material
ko=thermal conductivity of the gas in voids

Example 3

Using the same woody biotic filament insulation medium presented in Example 2, i.e., Pad #1 in table 1, it is possible to calculate the effective thermal conductivity of the biotic filament insulation medium.

The apparent porosity (AP) can be calculated via AP=(Ps−Pbm)/(Ps−Po), where
Ps=420 kg/m$^3$
Po=1.2 kg/m$^3$
Pbm=48 kg/m$^3$
such that AP=(420−48)/(420−1.2)=0.887
and the effective thermal conductivity of the biotic filament insulation medium (kbm) can be calculated via ks/kbm=1−AP$^{1/3}$+AP$^{1/3}$((ko/ks) AP$^{2/3}$+1−AP$^{2/3}$), where
ks=0.09 W/m-K
ko=0.025 W/m-K
such that ks/kbm=1−0.961+0.961/0.3336=2.919
kbm=0.09 w/m-k/2.919=0.0308 W/m-K Due to the nature of the biotic filament insulation medium, the thermal properties of the biotic filament insulation medium can be described using a property that takes into account the type(s) of biotic filament(s) used, the type of gas in the voids between biotic filaments, as well as the global moisture content of the BFIM. An effective thermal effusivity (EffE), based on the concept of the thermal effusivity (E) of a material, is a property that can be used to describe embodiments of the subject biotic filament insulation medium. Thermal effusivity (E) is defined as the square root of the product of the material's thermal conductivity and the material's volumetric heat capacity. Thermal effusivity (sometimes called the heat penetration coefficient) is the rate at which a material can absorb heat. Thermal effusivity is the property that determines the contact temperature of two bodies that touch each other. The heat penetration coefficient is practically experienceable when one feels different materials of same temperature with the bare hand. Materials with a high heat penetration coefficient (e.g., metals) are felt as particularly cold, when their temperature is less than the skin temperature. Materials with a low heat penetration coefficient (e.g., wood), when at the same temperature as the metal, are felt as warmer.

Thermal effusivity is a heat transfer property that characterizes the transient thermal behavior at the surface of an object when the surface of the object is in contact with a gaseous environment, or external object, which is at a different temperature than the surface of the object, such that thermal effusivity characterizes the transient thermal behavior that occurs when two or more materials are brought into contact with each other. As an example, the thermal effusivities of two semi-infinite objects determine the interfacial temperature when the two semi-infinite objects are at different temperatures and in contact with each other. The thermal effusivities of different materials differ due to the differing ability of the materials to transfer heat. This is due to differences in heat transfer through and between particles, and is therefore a function of particle size, particle shape, density, morphology, and moisture content.

The Thermal effusivity (E) of a material is defined as $$E = (kp\ Cp)^{1/2}$$

k: Thermal conductivity of the material (W/m-K)
p: Density of the material (kg/m$^3$)
Cp: Specific heat of the material (J/kg-K)

In the case of the biotic filament insulation medium, the Effective thermal effusivity (EffE) of the biotic filament insulation medium is defined as the square root of the product of: the effective thermal conductivity of the biotic filament insulation medium; the (effective) density of the biotic filament insulation medium; and the effective volumetric heat capacity of the biotic filament insulation medium.

$$EffE = (Effk\ Effp\ EffCp)^{1/2}$$

Effk: Effective thermal conductivity of the biotic filament insulation medium (W/m-K)
Effp: Density of the biotic filament insulation medium (kg/m$^3$)
EffCp: Specific heat of the biotic filament insulation medium (J/kg-K)

Example 4

Using the same biotic filament insulation medium as in Example 3, it is possible to calculate the Effective thermal effusivity (EffE) of the biotic filament insulation medium:
Effk: Effective thermal conductivity of the biotic filament insulation medium (W/m-K)=0.0308 W/m-K
Effp: Density of the biotic filament insulation medium (kg/m$^3$)=48 kg/m$^3$
EffCp: Specific heat of the biotic filament insulation medium (J/kg-K) or (W-s/kg-K)

= 0.887*Cp Air+0.113*Biotic material
= 0.887*1,005 J/kg-K+0.113*1,500 J/kg-K=1,061 J/kg-K
EffE=(0.0308 W/m-K*48 kg/m$^3$*1,061 J/kg-K)$^{1/2}$
=(0.0308 W/m-K*48 kg/m$^3$*1,061W-s/kg-K)$^{1/2}$=(1,568 W$^2$-s/m$^4$-K$^2$)$^{1/2}$ =39.6W-s/m$^2$-K =0.00396 W-s$^{1/2}$/cm$^2$-K The Effective thermal effusivity of the biotic filament insulation medium, which depends on the specific biotic filament materials, the interlocking arrangement of the biotic filaments, and the gas or gas mixture filling the voids, provides a very good indication of the thermal protection that is provided when the biotic filament insulation medium is used in insulating structures such as insulation pads. In general, the lower the value of the effective thermal effusivity of the biotic filament insulation medium is, the better the thermal insulation performance of the biotic filament insulation medium provides.

Table 2 presents data regarding the effective thermal effusivity of a biotic filament insulation medium of Example 1 and Example 2, using different biotic filament materials and corresponding interlocking arrangements, and apparent bulk density.

TABLE 2

| Biotic Filament Materials | Apparent Bulk Density (kg/m$^3$) | Effective thermal effusivity (W − s$^{1/2}$/m$^2$ − K) |
|---|---|---|
| Populus tremuloides (wood) filaments with air 20% moisture content | 48 | 39.8 |
| Populus tremuloides (wood) filaments with air 22% moisture content | 121 | 80.1 |
| Sphagnopsida moss filaments with air 20% moisture content | 35 | 32.1 |
| Populus tremuloides (wood) filaments with argon 22% moisture content | 48 | 26.1 |
| Quercus alba (wood) filaments with air 19% moisture content | 75 | 55.4 |

As seen in Table 2 the effective thermal effusivity of the biotic filament insulation pad #1 (first pad listed in Table 1), having an apparent bulk density of 48 kg/m$^3$, is 39.8 W-s$^{1/2}$/m$^2$-K, where Pad #2 (second pad listed in Table 1) having an apparent bulk density of 121 kg/m$^3$, has an effective thermal effusivity of 80.1 W-s$^{1/2}$/m$^2$-K (not listed in Table 2). This shows that the effective thermal effusivity is a good indicator of the thermal performance of a biotic filament insulation medium.

DETAILED DESCRIPTION

Embodiments of the subject invention relate to a method and apparatus for shipping products so as to control the temperatures the products are exposed to, using a biotic filament insulation medium to thermally insulate the products from the environment. Embodiments can increase the amount of time the product and/or portions of the product experience a desired temperature range and/or reduce the amount of time the product and/or portions of the product experience temperatures outside of the desired temperature range and/or experience an undesirable temperature range. A specific embodiment maintains the product temperatures within a desired temperature range for a desired amount of time when the insulating packaging container the product is within is positioned in a surrounding environment having a surrounding temperature that is higher than the desired temperature (e.g., within an expected surrounding temperature range) for at least an expected time period (e.g., maximum expected delivery time period).

Embodiments can incorporate a biotic filament insulation medium (BFIM), such as sphagnum moss, positioned around and/or near the product, where the product is positioned inside a packaging container, such that the biotic filament insulation medium creates a protective layer (thermally insulating layer) that slows down heat transfer from the surrounding environment to one or more other locations in the interior of the packaging container. The biotic filament insulation medium can reduce the transfer of heat from the outside of the packaging container to portions of the interior of the container desired to be kept cool (e.g., by a cold bank placed inside), and/or reduce the transfer of heat from portions of the interior of the packaging container desired to be kept warm (e.g., by a heat bank placed inside) to the outside of the packaging container (in the case of cold weather protection), and/or reduce the transfer of heat caused by frictional movement or solar radiation. Specific embodiments of the biotic filament insulation medium can be permanent or temporary and can incorporate a biotic material structure (BMS) made of filaments of one biotic material, or a BMS made of filaments of a combination of different biotic materials, and can have the voids between the filaments filled with one gas or gas mixture or with two or more different gases or gas mixtures.

Embodiments of the invention can be used for shipping products in an environment that is colder than the interior of packaging, such as during cold weather. In such embodiments, a warm bank, or a room temperature bank, such as gel packs, can be used inside the packaging container. The heat will move from the warm bank toward the outside of the packaging container, where the biotic filament insulation medium, having a low thermal conductivity and positioned to thermally insulate the product from the environment, reduces, or possibly prevents, the payload (product) from losing heat to the cold surroundings (environment).

Embodiments of the invention can use biotic materials in the subject biotic material insulation medium (e.g., use biotic filaments in the subject biotic filament insulation medium), rather than using environmentally unfriendly materials such as Expanded Polystyrene (EPS), Polyurethane foam (PUR), mylar bubble wrap, polypropylene foam, and vacuum insulated panels (VIP), to thermally protect a payload (product). Specific embodiments can also incorporate such environmentally less friendly materials for portions of the assembly, but have portions using biotic materials to enhance environmental friendliness. Specific embodiments can incorporate one or more thermal banks, such as cold banks, room temperature banks, and/or warm banks. Further embodiments can utilize multiple insulating structures, such as insulation mats, incorporating a biotic filament insulation medium, placed between flexible, semi-rigid, or rigid walls, where the walls contain, or partially contain, the position, orientation, and/or shape of the BFIM, to thermally protect the payload (product). Embodiments also incorporate BFIMs with or without a bounding agent or BFIMs that are contained, or partially contained, by an adhesive, such as glue, positioned on the biotic filaments to enhance the engaging interaction of the filaments, such as adhering the filaments to each other. Specific embodiments incorporate compostable glues positioned on the biotic filaments, to create adhesion of the filaments to each other, and/or compostable glues can be used to aid in forming the mechanical structure containing the BFIM's, such as for gluing a paper outer layer of an insulating pad. Protein glues have high water solubility but are insoluble in oils, waxes, organic solvents and absolute alcohol. They may be emulsified in water-oil or oil-water systems. The various other raw materials used to compound compostable glues are from the sugar, starch, polyol and salt families. All of the ingredients used to modify the adhesives are water-soluble. Other raw materials like corn syrup (glucose), sodium chloride (table salt), glycerin USP grade can be used for compostable glues. Commercial products such as Epotal® Eco (BASF) can be used as compostable glues.

The biotic filament insulation medium used in specific embodiments of the invention functions as a heat sink by absorbing at least a portion of the heat passing through the BFIM. By partially, or completely, surrounding the payload (product) with the biotic filament insulation medium, in a surrounding environment warmer than the payload, at least a portion of the heat absorbed by the biotic filament insulation medium will not reach the products (payload).

In a specific embodiment, a shipping container (packaging container) incorporates a biotic filament insulation medium positioned to substantially surround, and preferably completely surround, the cold bank and payload. In specific embodiments, the BFIM at least 70%, at least 80%, at least 85%, at least 90%, at least 95%, and/or at least 97% surrounds the payload. FIG. 3 shows an embodiment of the subject invention, incorporating a biotic filament insulation medium, designed for use with the packaging container positioned in a hot external environment, where the biotic filament insulation medium (10) surrounds the cold bank (13) and the payload (14). FIG. 3 shows an embodiment where the paper (such as kraft paper) (27) provides a mechanical structure to hold the BFIM in place so as to surround the payload, where the mechanical structure is an interior wall (27) between the BFIM and an interior defined by the interior wall (27) and an exterior wall (12) between the biotic filament insulation medium and an exterior (e.g., the surrounding environment) defined by the exterior wall (12), where the biotic filament insulation medium (10) is positioned between the interior wall (27) and the exterior wall (12).

Figure 4:
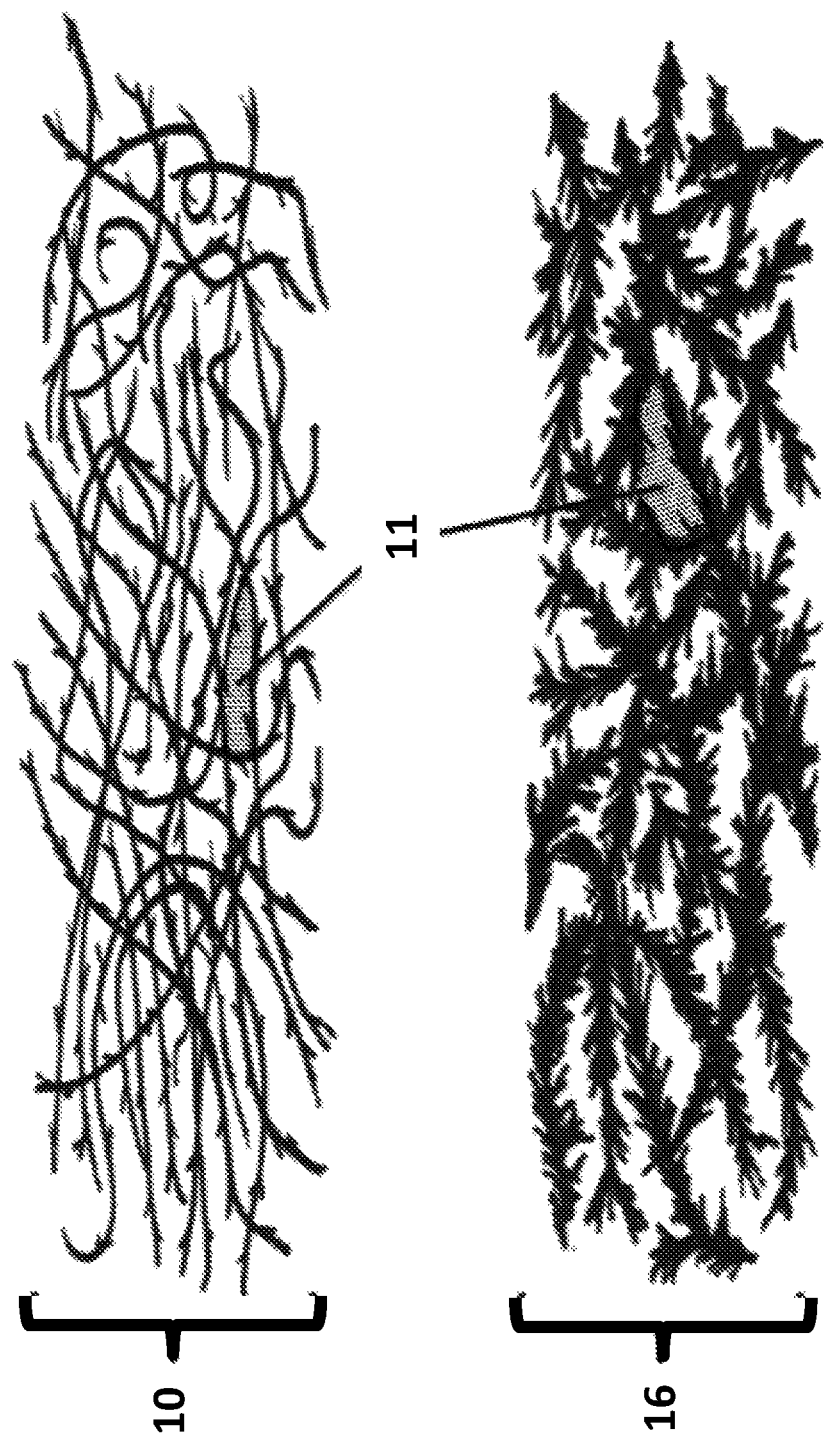
FIG. 4 shows the filament structures of two specific examples of biotic materials that can be used to form a BMS in accordance with an embodiment of the subject invention.
Figure 5:
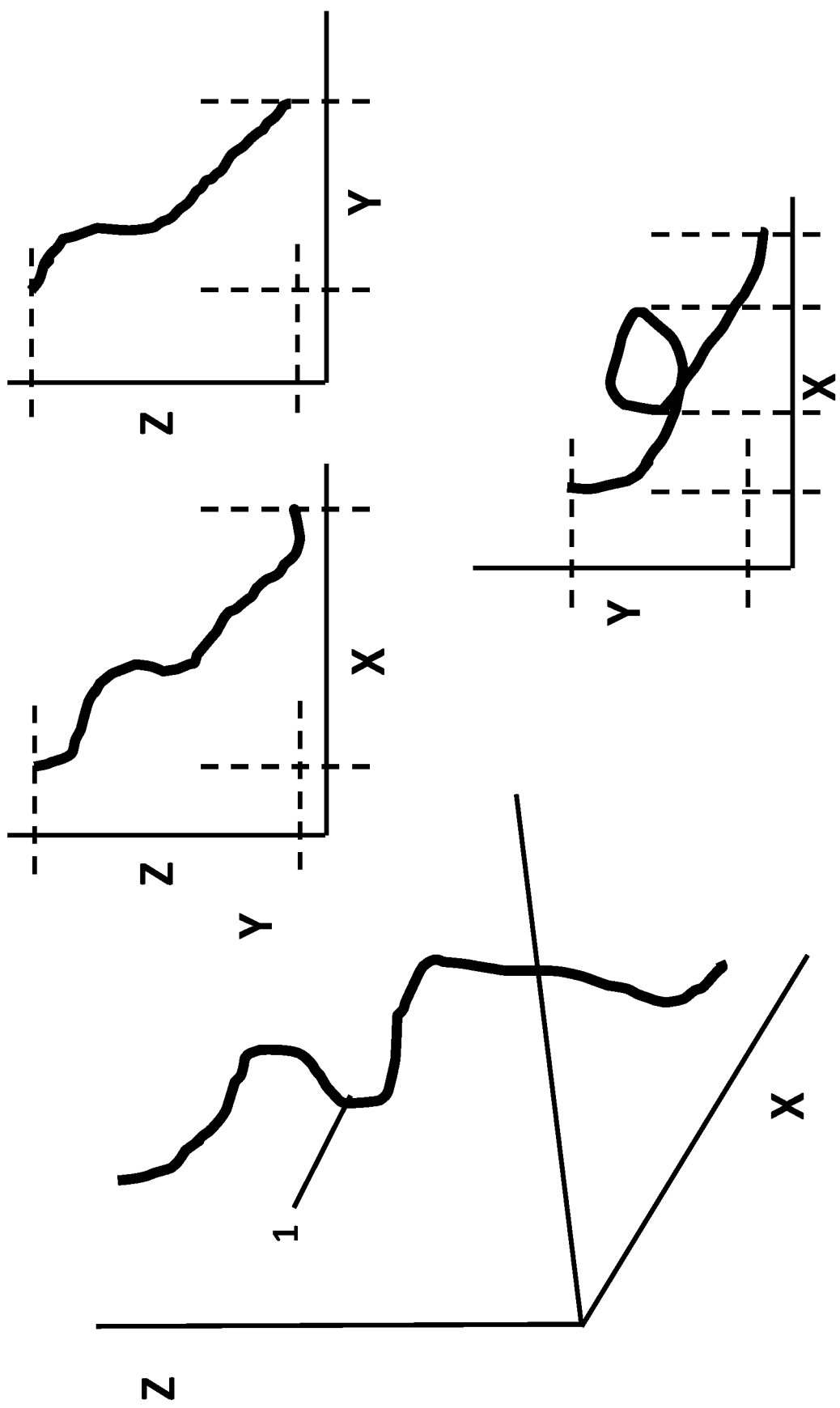
FIG. 5 shows a three dimensional representation of the structure of an individual biotic material filaments that can be used in accordance with an embodiment of the subject invention.

FIG. 4 shows the porous material structure of the woody biotic filament insulation medium (10) of the embodiment shown in FIG. 3 or bryophyte biotic filament insulation medium (16), where more than 10% of the void space (11) (total open void volume) is voids larger than 1 mm³. In specific embodiments, more than 10%, more than 20%, more than 30%, more than 40%, and/or more than 50%, of the void space (total open void volume) is voids larger than 0.5 mm³, larger than 0.6 mm³, larger than 0.7 mm³, larger than 0.8 mm³, larger than 0.9 mm³, larger than 1 0.1 mm³, larger than 1.2 mm³, larger than 1.3 mm³, larger than 1.4 mm³, and/or larger than 1.5 mm³. Biotic filaments can have a variety of shapes, such as an elongated shape and/or helical, with a rectangular, triangular, square, elliptical, round, helical, and/or irregular cross-sectional shape. Other examples of shapes the biotic filaments can have include, but are not limited to: flat, spherical, polyhedron, and tubular. The desirable shape of a biotic filament would be similar to a random three-dimensional shape in order to promote interlocking between the filaments. The quality of the interlocking will determine the mechanical strength, stiffness, and thermal properties of the biotic filament insulation medium. Even though it is difficult to quantify the physical shape of a biotic filament, it is possible to use the tortuosity of the filament. Tortuosity is a property of curve being tortuous (twisted; having many turns). There have been several attempts to quantify this property. Tortuosity is commonly used to describe diffusion in porous media but can be also applied in the case of biotic filament. The simplest mathematical method to estimate tortuosity is the ratio of the actual distance traveled between two points, including any curves encountered, divided by the straight line distance. Specific embodiments incorporate biotic filaments that have tortuosity in all three dimensions, in order to create a desirable physical interaction between the biotic filaments in the biotic filament insulation medium. FIG. 5 shows a biotic filament 1 having tortuosity in all three dimensions.

Figure 6:
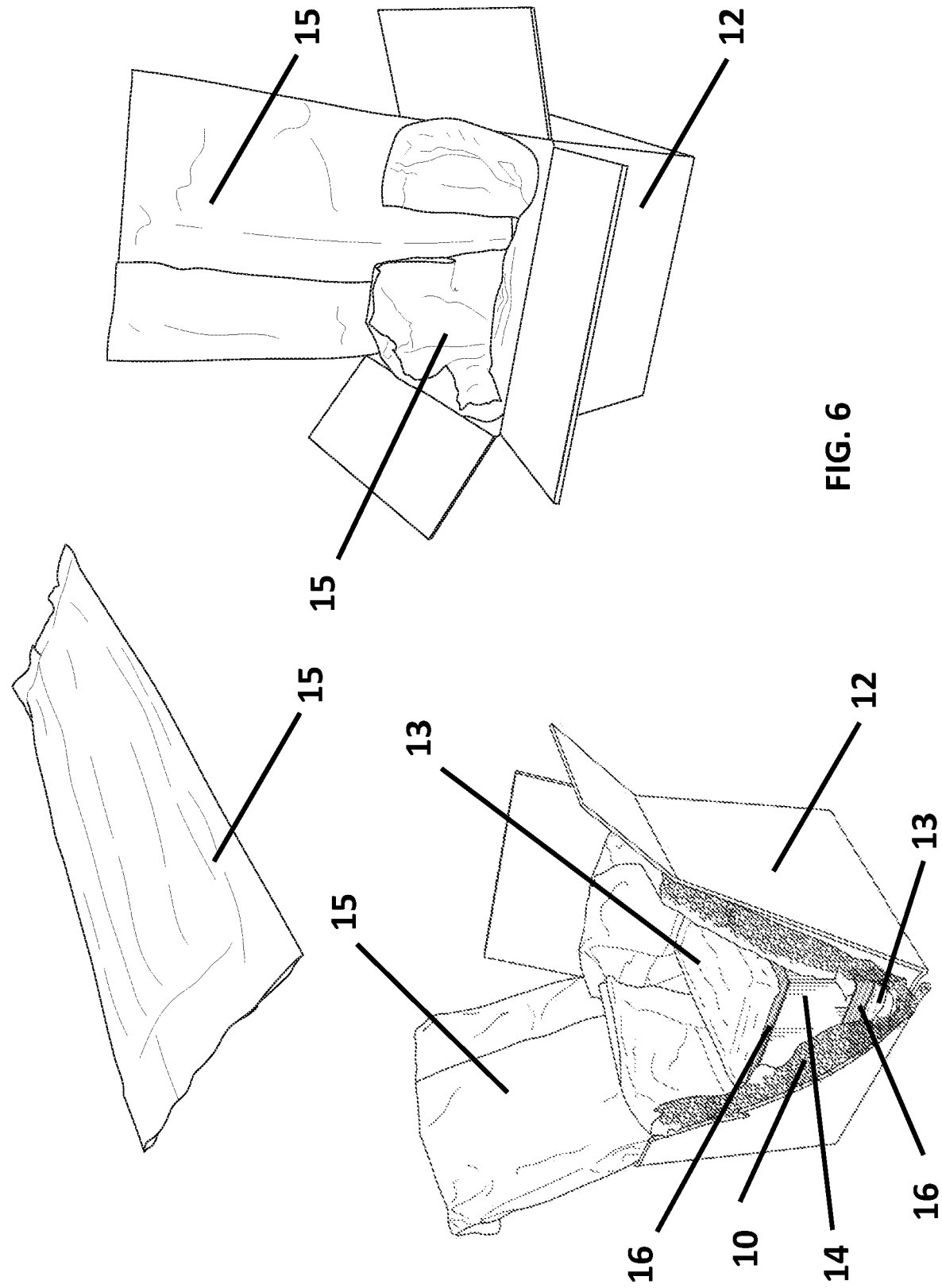
FIG. 6 shows an embodiment of an insulating packaging container assembly incorporating a packaging container, two insulating pads used for cold products, in accordance with an embodiment of the subject invention.

FIG. 6 shows an embodiment of a packaging container assembly having a payload (i.e., product (14)) positioned within an interior of the packaging container (i.e., a corrugated box (12)), where the packaging container assembly incorporates: two wrapping biotic filament insulation pads (15), incorporating a biotic filament insulation medium having woody biotic filaments, where the BFIM is configured within a material structure (i.e., wrapped in paper (15)); where the two flexible insulating pads are wrapping two cold banks (13) (e.g., two cold gel packs), where one cold bank is at the top (e.g., over the payload (14)) and the other cold bank is at the bottom (e.g., under the payload); and optional corrugated sheets (16) placed between the payload (14) and the cold banks (13), to prevent damage to the payload (e.g., from moisture or undesirable cooling), all placed inside the corrugated box (packaging container). It is noted that top and bottom are relative to the orientation of the packaging container with respect to the earth's gravitational field, and if the packaging container is turned on its side, top and bottom become a side of the product and the opposite side of the product.

This embodiment is designed for use with the packaging container assembly, having the payload (product) within, being positioned in a hot, or cold, external environment, such as being transported and/or stored in a shipping and/or storage environment. The biotic filament insulation medium incorporated into each flexible pad has a low effective thermal effusivity, which slows the heat penetration into the biotic filament insulation medium, thus decreasing the chances for heat from the environment to reach the temperature sensitive product. Specific embodiments can incorporate a biotic filament insulation medium having a thickness of at least 5 mm, at least 10 mm, at least 15 mm, at least 20 mm, at least 25 mm, at least 30 mm, less than 200 mm, less than 10 mm, and/or in a range between any two of the listed thicknesses. Specific embodiments can use a biotic filament insulation medium having an effective thermal effusivity less than or equal to 125 W-su$^{1/2}$/m²-K, less than or equal to 100 W-sm$^{1/2}$/m²-K, less than or equal to 80 W-s$^{1/2}$/m²-K, less than or equal to 60 W-s$^{1/2}$/m²-K, less than or equal to 50 W-s$^{1/2}$/m²-K, and/or in a range between any two of the listed values.

There are many variables with respect to the biotic filament insulation medium, and/or any outer mechanical structure (e.g., outer covering) the biotic filament insulation medium may be positioned with respect to (e.g., within), which can be adjusted to achieve a different thermal effusivity. The thermal effusivities of materials vary due to each material's differing ability to transfer heat. This is due to differences in heat transfer through and between particles, and is therefore a function of particle size, particle shape, density, morphology, and moisture content. Examples of biotic filament materials that can be incorporated into, and/or form, a biotic filament insulation medium having an effective thermal effusivity within a desired range, which can be utilized in embodiments of the subject invention include, but are not limited to: aspen wood wool (39.8 $W-s^{1/2}/m^2-K$), sphagnum moss (32.1 $W-s^{1/2}/2/m^2-K$), and oak wood wool (55.4 $W-s^{1/2}/m^2-K$). Other biotic filament materials can also be used alone, layered, or mixed together in order to achieve the desirable thermal and mechanical properties. In an embodiment, mixing two biotic materials can increase the insulation thermal properties of the resulting BMIM, when compared to a biotic material insulation medium using either biotic materials alone, such as mixing biotic sphagnum moss and aspen woody biotic filaments (50/50), where the thermal conductivity of Aspen Woody Biotic Medium "thickness=58.5 mW/m-K, the thermal conductivity of Sphagnum Moss Biotic Medium 1" thickness=45.7 mW/m-K, and thermal conductivity of Aspen Woody/Moss Biotic Medium (50/50) 1" thick=35.6 mW/m-K.

Figure 7:
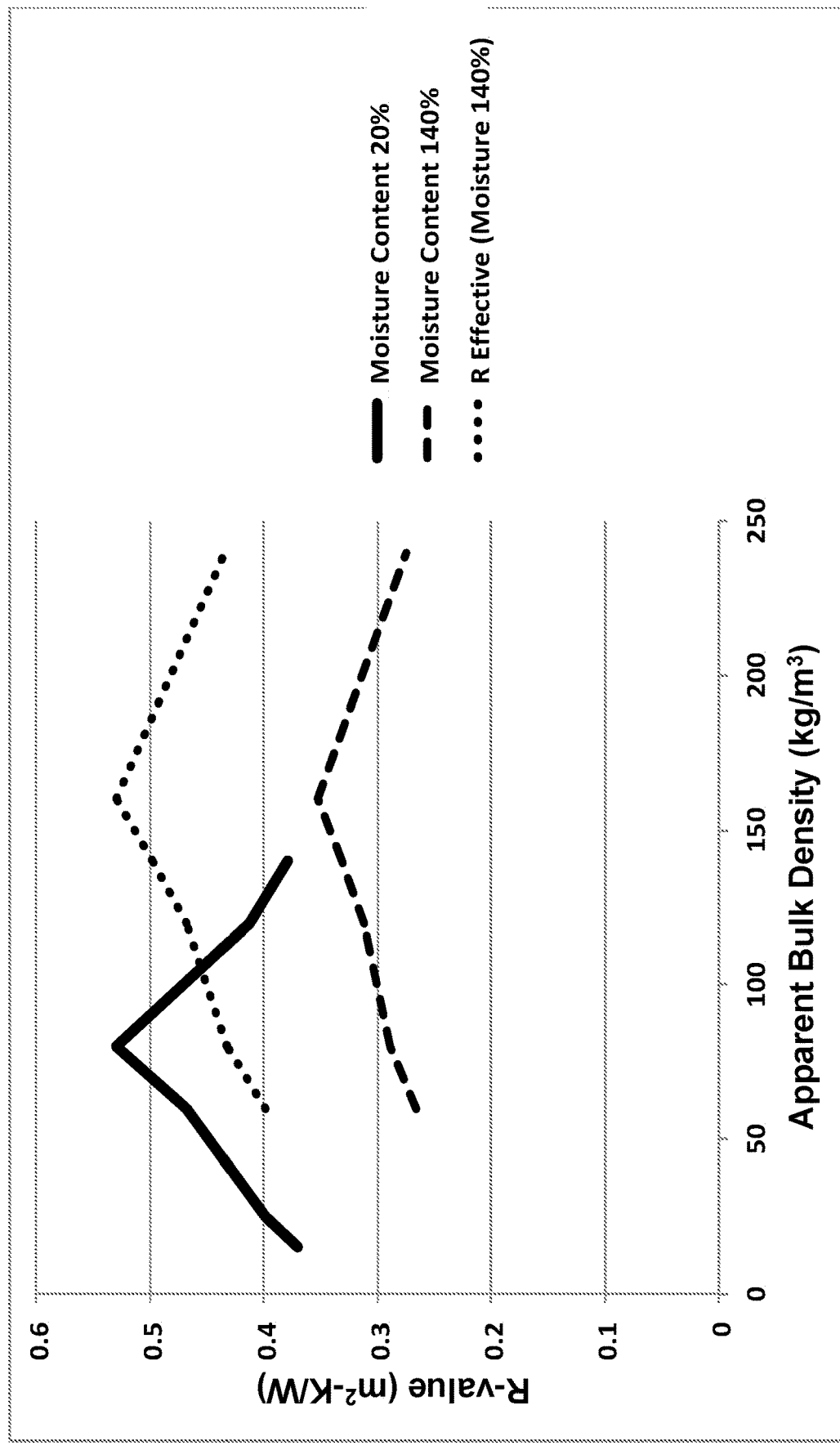
FIG. 7 shows the relationship between insulation properties in R Value and the apparent bulk density of a woody biotic filament insulation medium.

The apparent bulk density of a biotic filament insulation medium (BFIM) can be selected by its capacity to resist heat flow, which is known as R-value ($m^2-K/W$), where R-value is provide per inch of thickness. The higher the R-value, the greater is its insulating power. Biotic filament insulation mediums have an optimal apparent bulk density where the highest R-value can be achieved. Knowing the relationship between R-value and the apparent bulk density can help when selecting the right R-value when looking to find a compromise between total weight of the solution (i.e., the biotic filament insulation medium and its thermal insulation properties. FIG. 7 shows the relationship between R-value and the apparent bulk density of a woody biotic filament insulation medium (aspen filaments with air in the voids). For this case, the maximum R-value is achieved when the woody biotic filament insulation medium has an apparent bulk density of 80 $kg/m^3$. The general shape of the curve will be the same for other filament materials, such that the R-valve increases for increasing apparent bulk density, peaks, and then declines for further apparent bulk density. Although the peak R-valve is often desirable, there may be other factors to weigh, such as the weight of the BFIM, that results in selecting a lower R-valve.

FIG. 7 also shows the effect of increasing the moisture content of the great lakes aspen excelsior pad, where an increase of moisture content will lower the R-value of the pad, since water is very thermally conductive. The dashed curve shows the R-value when the thickness of the pad is restrained so as to remain constant. However, when not constrained, the Aspen excelsior pads expand significantly with an increase of its moisture content, which improves the "effective" R-value due to the expansion of the thickness as shown by the dotted curve in FIG. 7. Preferably, for a given biotic material, the apparent density is adjusted to obtain within 5% of the maximum R-value, but when other factors, such as weight, are more important, additional embodiments can achieve within 10%, 20%, 30%, 40%, 50%, and/or 60% of the maximum R-value.

Three biotic material insulation mediums had moisture added and the resulting expansion due to moisture measured as follows:

expansion ratio for a 1 inch thick woody biotic medium pad (thickness)

| Moisture Content (%) | Expansion Ratio |
| --- | --- |
| 20 | 1 |
| 140 | 1.52 |
| 260 | 1.93 |
| 275 | 2.14 |
| 290 | 2.39 | expansion ratio for a 1 inch thick biotic Sphagnopsida moss medium pad (thickness)

| Moisture Content (%) | Expansion Ratio |
| --- | --- |
| 20 | 1 |
| 140 | 1.1 |
| 260 | 1.13 |
| 380 | 1.21 |
| 495 | 1.26 | expansion ratio for biotic Sphagnopsida moss (50%) and woody (50%) medium pad (thickness)

| Moisture Content (%) | Expansion Ratio |
| --- | --- |
| 20 | 1 |
| 150 | 1.16 |
| 275 | 1.33 |
| 400 | 1.61 | noting that the maximum moisture content of a woody biotic medium pad (Populus tremuloides)=330%, and the maximum moisture content of a Sphagnopsida moss biotic pad=2,300%.

A variety of methods of measuring thermal conductivity can be used. For data presented in the subject application, the comparative cut bar method, which is widely used for determining axial thermal conductivity, was used. This method is based on the principle of comparing thermal gradients between cold and warm surfaces. In this method, heat flux is passed through samples of known and unknown materials. A sample of unknown material is sandwiched between two reference samples. Knowing the thermal conductivity of the reference samples, the heat flux through the unknown sample can be calculated and its thermal conductivity determined. An example of another method that can be used is the probe method, which was used to provide a quicker measurement, and in which the thermal conductivity of a sample is determined by inserting a 'hypodermic needle probe' into the sample and measuring its response. A thermocouple and a heater are attached to the probe. This method is suitable for measurement of thermal conductivity in materials that are in semi rigid form, such as loose biotic material medium.

Figure 8:
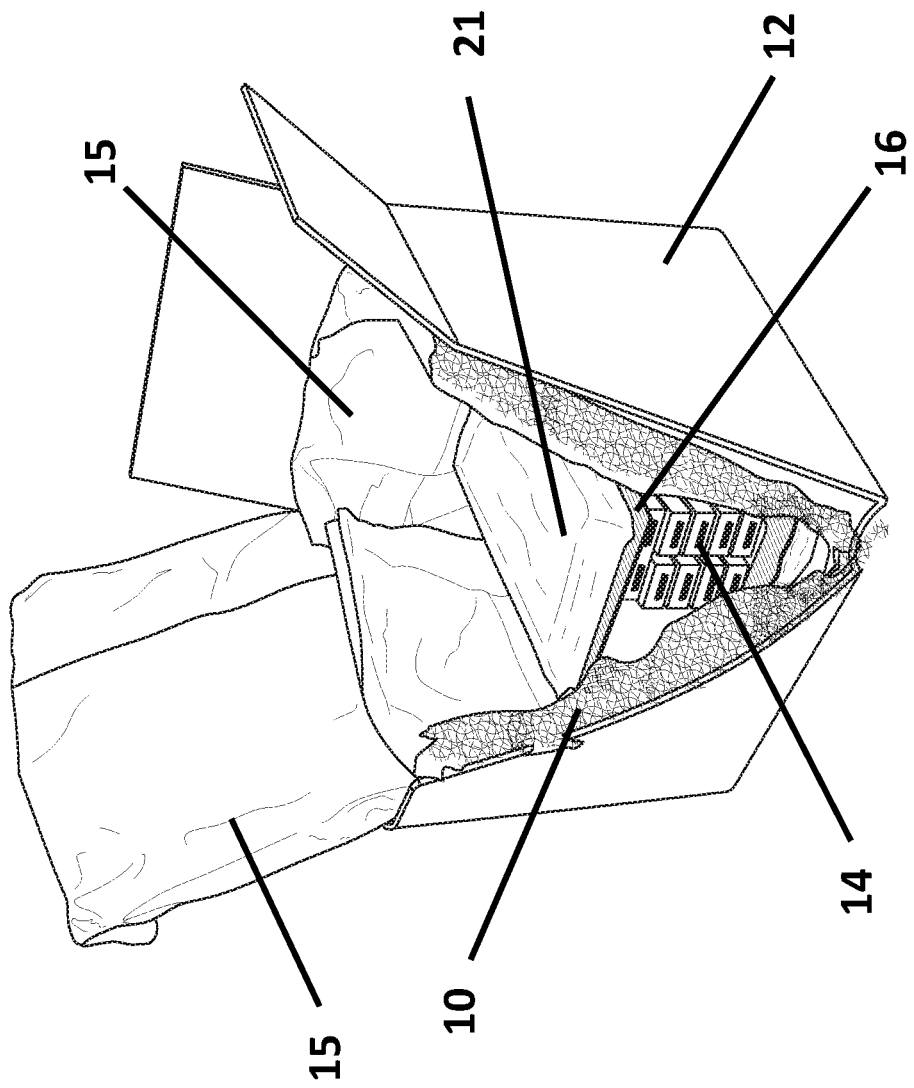
FIG. 8 shows an embodiment of an insulating packaging container assembly incorporating a packaging container, insulating pads, a thermal bank, a separating sheet, and a payload, used for controlled room temperature products, in accordance with an embodiment of the subject invention.

FIG. 8 shows an embodiment that is a modification of the embodiment of FIG. 6, incorporating two flexible insulating pads, each flexible insulating pad incorporating a corresponding biotic filament insulation medium wrapped by a flexible outer covering (e.g., kraft paper) placed in a corrugated box (12), which can be used for products, such as controlled room temperature products, that need to be maintained between 15° C.-30° C. when the packaging container assembly is positioned in environments where temperatures are in a specified range, such as: at room temperature, higher than room temperature, lower than room temperature, between 15° C. and 30° C., between 15° C. and room temperature, and between room temperature and 30° C. In FIG. 8, two woody biotic filament flexible pads (15) incorporating a biotic filament insulation medium (10) in accordance with an embodiment of the invention is wrapping a 32 ounce ice pack (21) that is placed on top of the payload (14). The flexible pad can be compressed as much as 90% and still maintain sufficient insulation properties, as well as retain the ability to return to the flexible pad's original thickness (or at least 95%, 90%, 85%, 80%, and/or 75% of the flexible pad's original thickness) after the payload and ice packs are removed. This embodiment incorporates woody biotic filaments into the biotic filament insulation medium that is wrapped with a flexible pad having a flexible outer coating, which allows the flexible pad to maintain physical properties within desired specifications by having woody biotic filament materials with a modulus of elasticity in the range of 500 kg/mm² to 1600 kg/mm² (at least in the direction of thickness of the flexible pad) and a modulus of rupture in the range of 4 kg/mm² to 14 kg/mm².

Tests were conducted on multiple embodiments of BFIM's, and the tests show significant improvement in the efficiency of a biotic filament insulation medium when the apparent porosity of the biotic filament insulation medium is increased. Table 3 shows data for the testing of an insulated packaging system (e.g., packaging container assembly) utilizing three different biotic filament insulation mediums that have different apparent porosities. The best result was obtained for the BFIM having an apparent porosity of 88.6%. Specific embodiments can have an apparent porosity of at least 50%, at least 60%, at least 70%, at least 80%, at least 85%, at least 90%, at least 95%, less than 60%, and/or within a range between any two of these listed values. The tests were conducted using a packaging container assembly shown in FIG. 3, with a corrugated box having dimensions of 9"×11"×12" used as the packing container, two woody biotic filament flexible insulation pads described above in the description of the embodiment of FIG. 6, where each flexible insulation pad was placed in a U shape configuration such that the two flexible insulation pads effectively surrounded the product, 2 frozen gels (26 ounces each), ⅛" corrugated sheet (between payload and frozen gel) and a payload of 20 ml (two 10-ounce vials). This packaging container assembly is designed to maintain the product in a temperature range of 2-8.5° C. for at least 36 hours during a typical summer shipment. In specific embodiments, the packaging container assembly is designed to maintain the product in a temperature range of 2-8.5° C. when the packaging container assembly is exposed to temperatures following the ISTA 7E and/or ISTA 7D summer temperature/time profile(s), and/or a winter shipment exposed to the ISTA 7E and/or ISTA 7D winter temperature/time profiles, and/or other temperature/time profiles specific to the situation. Table 4 presents different versions of the embodiments similar to the one showed in FIG. 6.

TABLE 3

Effects of Apparent Bulk Porosity of Biotic Filament Insulation Pad

| Pad | Apparent Bulk Porosity | Time to reach 8.5° C. |
|---|---|---|
| 1 | 88.6% | 37 hours |
| 2 | 84.5% | 32 hours |
| 3 | 71.1% | 27 hours |

TABLE 4

Different versions of the embodiment for shipping cold chain pharmaceutical products
40 Hours Summer Shipment

| Cooler Type | Amount of 26 oz. Frozen Gels | External Dimensions (in.) | Weight (lb.) | Payload Size W × L × H (in.) | BFIM Thickness (in.) |
|---|---|---|---|---|---|
| Small | 2 | 8 × 12 × 8 | 4.70 | 8 × 6 × 2.5 | 1.5 |
| Medium | 3 | 9 × 11 × 11 | 6.8 | 6 × 8 × 5 | 1.5 |
| Large | 4 | 12 × 13 × 11 | 9.5 | 8.5 × 10.5 × 6 | 1.5 |

Figure 9:
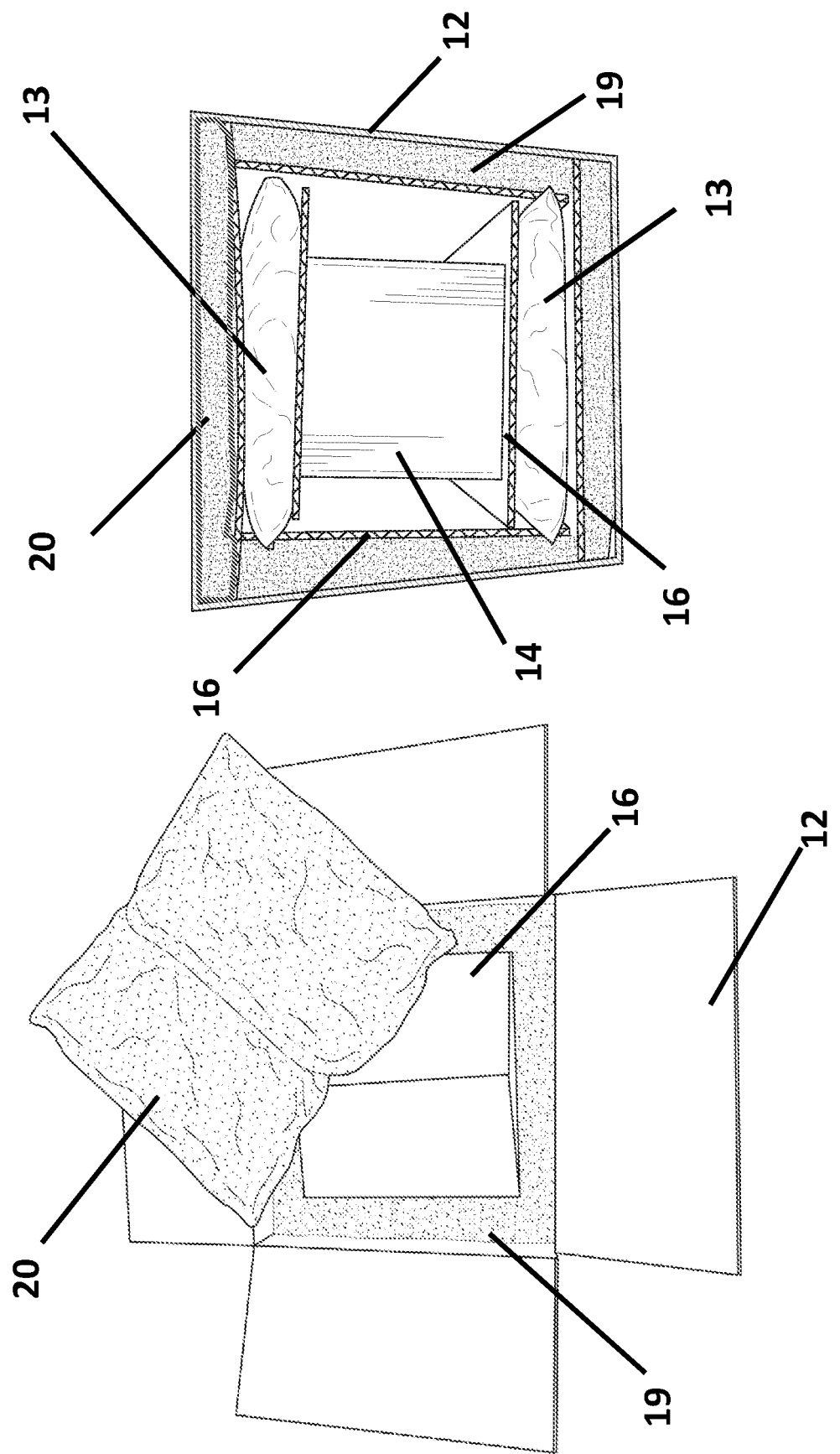
FIG. 9 shows an embodiment of an insulating packaging container assembly, incorporating an insulating packaging container in the form of a cooler, having loose fill PPBM between the walls of the insulating packaging container in accordance with an embodiment of the subject invention.

There are many ways to implement the use of a biotic filament insulation medium in a packaging system in accordance with embodiments of the invention. Embodiments of the invention also pertain to a biotic filament insulation medium that can be created by positioning loose biotic materials, such as biotic filaments, between portions of one or more mechanical structures (e.g., walls, covers, and meshes) made of materials such as paper, plastic, or other enclosure materials that have the structural capability to hold the biotic materials of the BMIM in a fixed relative position or within a range of potential relative positions, such that the loose biotic filaments remain in a desired biotic material structure or within a range of desired BMS's. FIG. 9 shows an embodiment using such loose biotic materials, such as biotic filaments. In the embodiment shown in FIG. 9, loose biotic filaments (19) are positioned between two mechanical structures made of corrugated cardboard, forming the biotic filament insulation medium between the two mechanical structures (12). In particular, a first mechanical structure forms an interior bottom and four interior sides, while a second mechanical structure forms an exterior bottom and four exterior sides, such that the loose biotic filaments are positioned between the interior and exterior bottoms and sides. Likewise, a lid (20) is provided with loose biotic filaments within the mechanical structure (e.g., walls of the lid). Referring to FIG. 9, the biotic filament insulation medium can have a biotic material structure that is nonwoven, that is loose fill (e.g., loose biotic filaments), and that is fully or partially encapsulated between structural materials, such as paper, plastic, conductive materials, composite materials, and/or other enclosure structural materials having appropriate structural properties. The enclosure structures enclosing the biotic filaments can be rigid or non-rigid, porous or non-porous, and permeable or non-permeable, and combinations thereof. In further embodiments, an adhesive (e.g., glue) can be used as a mechanical structure that wholly, or partially, maintains the BMS of the biotic filament insulation medium in a fixed BMS or within a range of defined BMS's, and/or further secures the biotic filaments together once a desired BMS is achieved.

Figure 11:
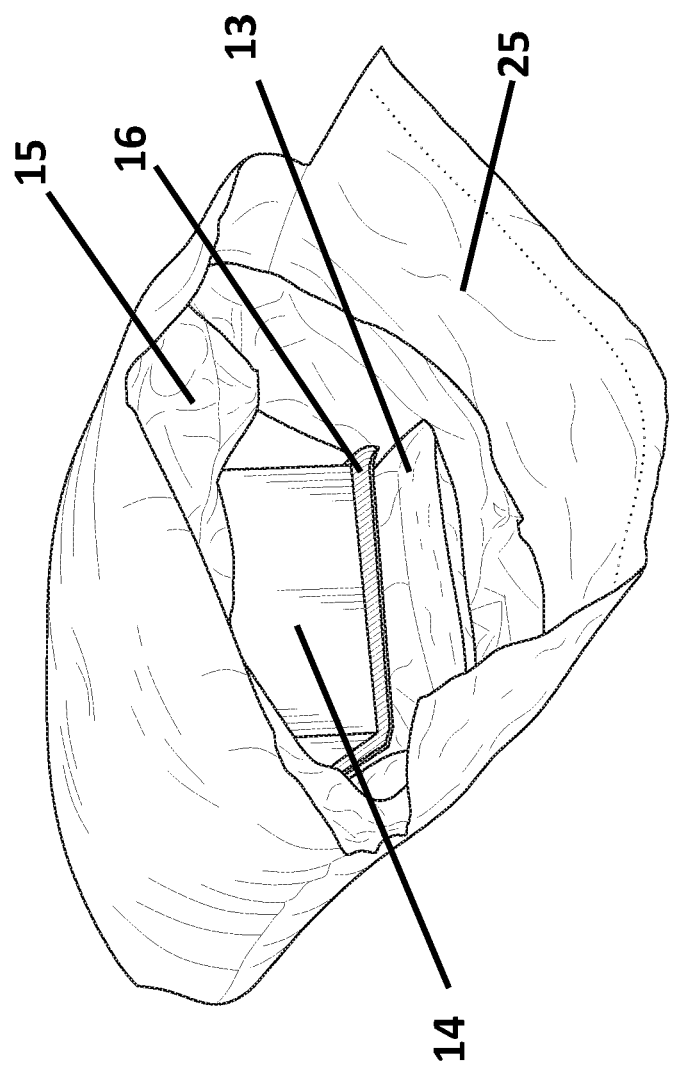
FIG. 11 shows an embodiment of an insulating pouch assembly incorporating an insulating pad, a thermal bank, an optional separating sheet, and a payload, used for cold products, in accordance with an embodiment of the subject invention.

Applications to which embodiments of the invention can be utilized include, but are not limited to, using the biotic filament insulation medium wrapped in paper (15), such as kraft paper, in a pouch system (25) for mail order shipping as shown in FIG. 11; as an insulated containers such as ice chests; a lunch box; a medicine shipping package, a medicine box carrier; food box shipping package; food box carrier, meal kit shipping package, meal kit carrier, animal/pet food shipping package, animal/pet carrier, animal/pet medicine shipping package, animal/pet medicine carrier, food carrier; and large insulated shipping systems such as insulated pallet load systems. The biotic filament insulation medium can be incorporated into an insulation pad (or other insulation structure), which can be used in a packaging system that fully or partially surrounds the load with the insulation pad (or other insulation structure). Most biotic filaments made of biotic materials such as wood and moss have a natural ability to retain and absorb water the biotic material is exposed to. This feature is highly desirable in the case of cold product shipments, when condensation and/or ice pack leaks can occur during transit. The biotic filament insulation medium can prevent water from reaching, or reduce the amount of water that reaches, the payload, and/or prevent, or reduce, leaks of water from the inside to the outside the shipping container, by absorbing liquid water and/or water vapor in contact with the biotic filament insulating medium (BFIM). Usually, a BFIM should be able to absorb about 1 times, at least 2 times, at least 3 times, and/or at least 4 times its weight in liquid, and/or an amount in a range between any two of the listed values. In embodiments, although the absorbed mixture conducts heat, the BFIM can absorb water without fully reducing the thermal insulating properties, due to the thickness of the BFIM increasing as the moisture is absorbed, without dissolving or deteriorating. The increase in thickness of the BFIM can offset at least 50%, 60%, 70%, 80%, 90%, and/or 100% of the loss of insulating R-value of the BFIM absorbing such moisture. Embodiments can provide space for such expansion of the BFIM absorbing such moisture.

Specific embodiments of the invention can form, using a biotic filament insulation medium, an insulated shipping container having a volume of at least 1 cubic foot, at least 2 cubic feet, at least 3 cubic feet, at least 4 cubic feet, at least 5 cubic feet, at least 10 cubic feet, at least 15 cubic feet, at least 20 cubic feet, at least 25 cubic feet, at least 30 cubic feet, at least 35 cubic feet, at least 40 cubic feet, at least 45 cubic feet, at least 50 cubic feet, at least 55 cubic feet, at least 60 cubic feet, at least 64 cubic feet and/or having a volume in a range between any two of the listed values. A specific embodiment can be utilized in a pallet shipper system, for shipping product on a pallet, where the pallet shipper system is configured for the following: the pallet can be approximately 4 feet long by 4 feet wide and the height of the load can be approximately 6 feet, creating a volume of approximately 96 cubic feet, where the pallet shipper system can optionally incorporate no thermal bank, or at least one thermal bank, such as a cold bank, room temperature bank, or warm bank, and the payload can be fully, substantially fully, or partially surrounded, or be incorporated inside a pallet load that is fully, substantially fully, or partially surrounded, either permanently or temporarily, by a biotic filament insulation medium and/or the sides and top of the payload can be fully, substantially fully, or partially separated from the external environment (where the bottom of the payload is separated from the external environment to the extent the pallet accomplishes such separation). The biotic filament insulation medium can have an outer covering, and can surround the product (payload or pallet load), so as to provide thermal insulation between the product and the environment and between the thermal bank (room temperature bank, cold bank, or warm bank) and the environment outside of the package.

Figure 10:
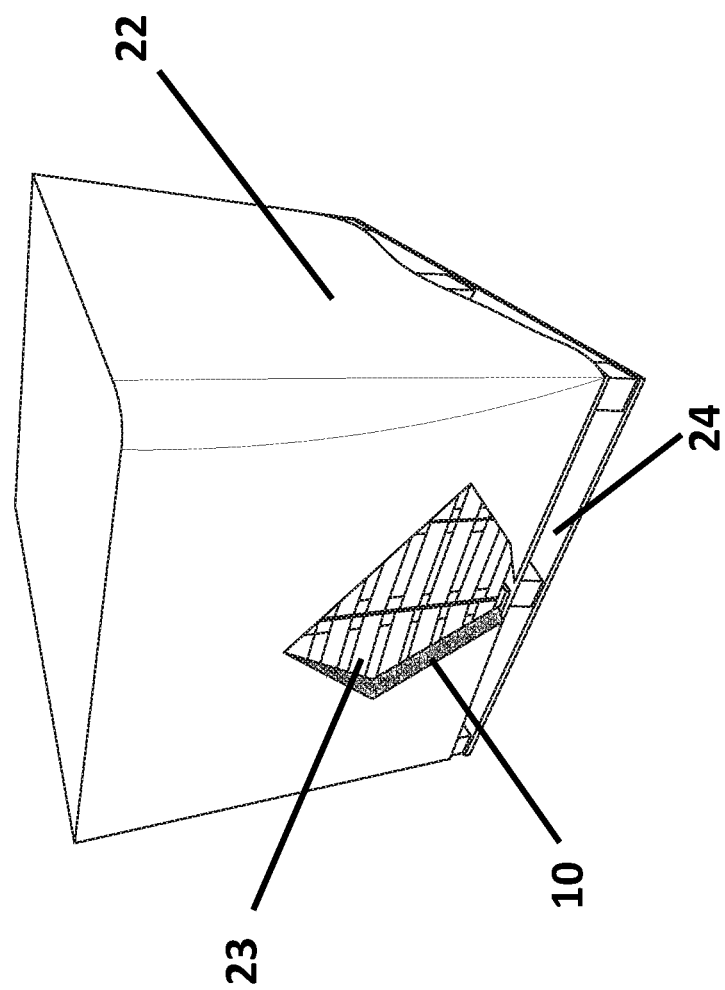
FIG. 10 shows an embodiment of an insulating pallet blanket in accordance with an embodiment of the subject invention.

FIG. 10 shows a pallet load (24) of fresh produce (23) protected by a flexible blanket (22) incorporating a biotic filament insulation medium (10) enclosed within an outer covering. In an embodiment, the flexible blanket of FIG. 6, incorporating a biotic filament insulation medium and an outer covering, allow gas exchange between the fresh produce and the environment outside of the pallet load by having sufficient gas permeability (such as for oxygen, carbon dioxide, and/or water vapor), in order to prevent the produce from being damaged, or reduce such damage, by a lack of oxygen, an accumulation of carbon dioxide, and/or condensation buildup. In a specific embodiment, which can be used, for example, for a pallet load of fresh asparagus, the biotic filament insulation blanket, incorporating a biotic filament medium and an outer covering, has a permeance for oxygen of at least $15.6 \times 10^3$ $L_{O2}/(m^2$ atm d), a permeance for carbon dioxide of at least $23.4 \times 10^3$ $L_{CO2}/(m^2$ atm d), and a permeance for water vapor of at least $1 \times 10^3$ $g_{water}/(m\ 2$ atm d), which allows sufficient gas exchange between the fresh asparagus and the environment, so as to avoid damage to the produce (fresh asparagus), and allows sufficient water vapor exchange between the fresh asparagus and the environment to avoid too much condensation inside the load (fresh asparagus releases a significant amount of water). The flexible blanket can be positioned between the pallet and the load, or the load can be placed directly on the pallet.

Embodiments of the invention can maintain the product shipped within the packaging container in a temperature range of 2-8° C. (e.g., for non-frozen shipments); in a temperature range of less than or equal to 0° C. (e.g., for frozen shipments where the cold bank can utilize liquid nitrogen, dry ice, and/or ice); and/or in a temperature range of 15° C. to 25° C. (e.g., for shipping controlled room temperature (CRT) products), and/or in a temperature range of 20° C. to 25° C., and/or in a temperature range of 0° C. to 5° C., and/or in a temperature range of 2° C. to 4° C., and/or in a temperature range of 10° C. to 15° C., and/or in a temperature range of 15.C to 30° C., and/or in a temperature range of 2° C. to 30° C. where the packaging container assembly, with payload, is exposed to a shipping environment that is variable temperature changes. Embodiments can also be used for shipping products so as to maintain a higher temperature range than the environment.

Figure 12:
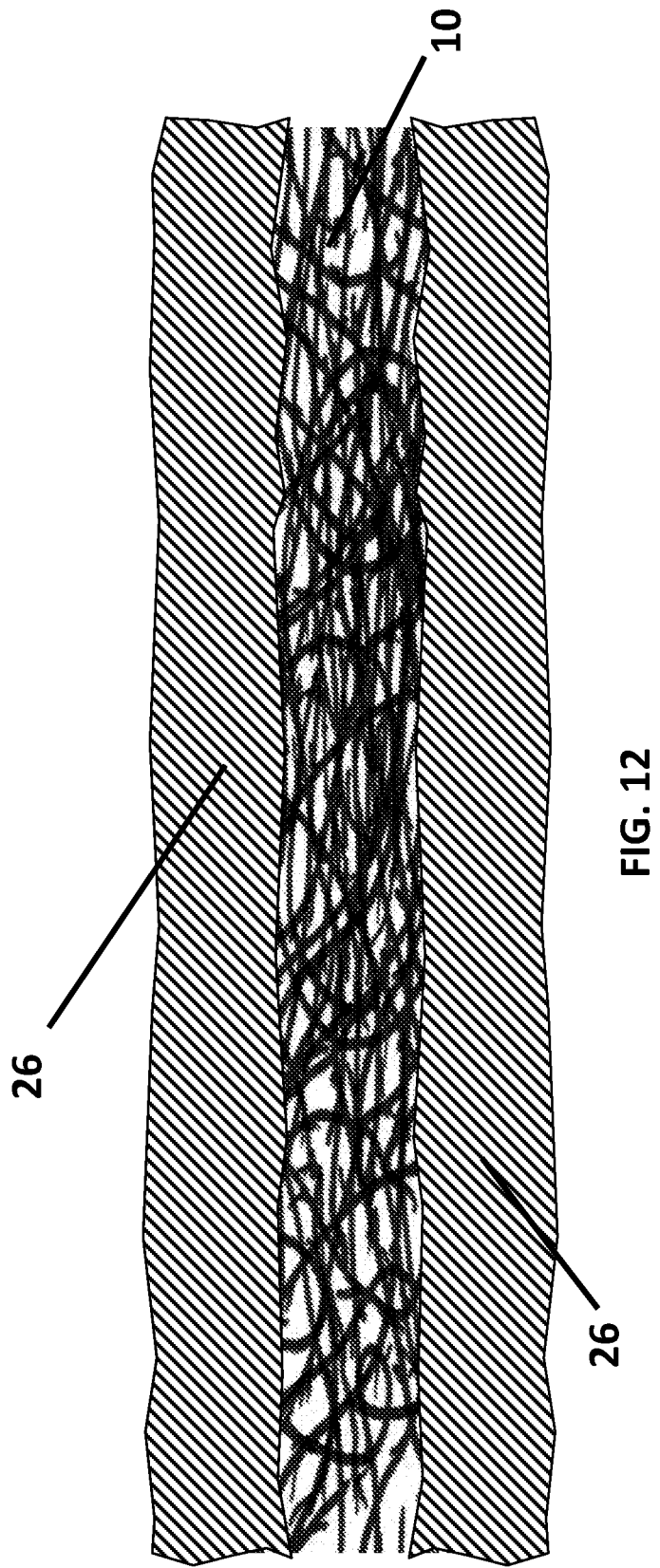
FIG. 12 shows an embodiment of an insulating pad made of a biotic insulation material between two layers of non-biotic insulation material in accordance with an embodiment of the subject invention.

Embodiments of the invention can combine biotic filament insulation materials to non-biotic insulation materials such as polystyrene, polyurethane foam or cornstarch foam, corn based insulation, fungi based insulations, aerogels, or paper in order to reduce the environmental impact of an insulated packaging container to ship temperature sensitive products, modify the thermal insulation properties, modify the physical structural properties, or provide additional features. FIG. 12 shows a potential use of the embodiment by combining non-biotic insulation materials (26) with biotic filament insulation materials (10) used as the core to provide structure, insulation and reduce environmental impacts.

Figure 13:
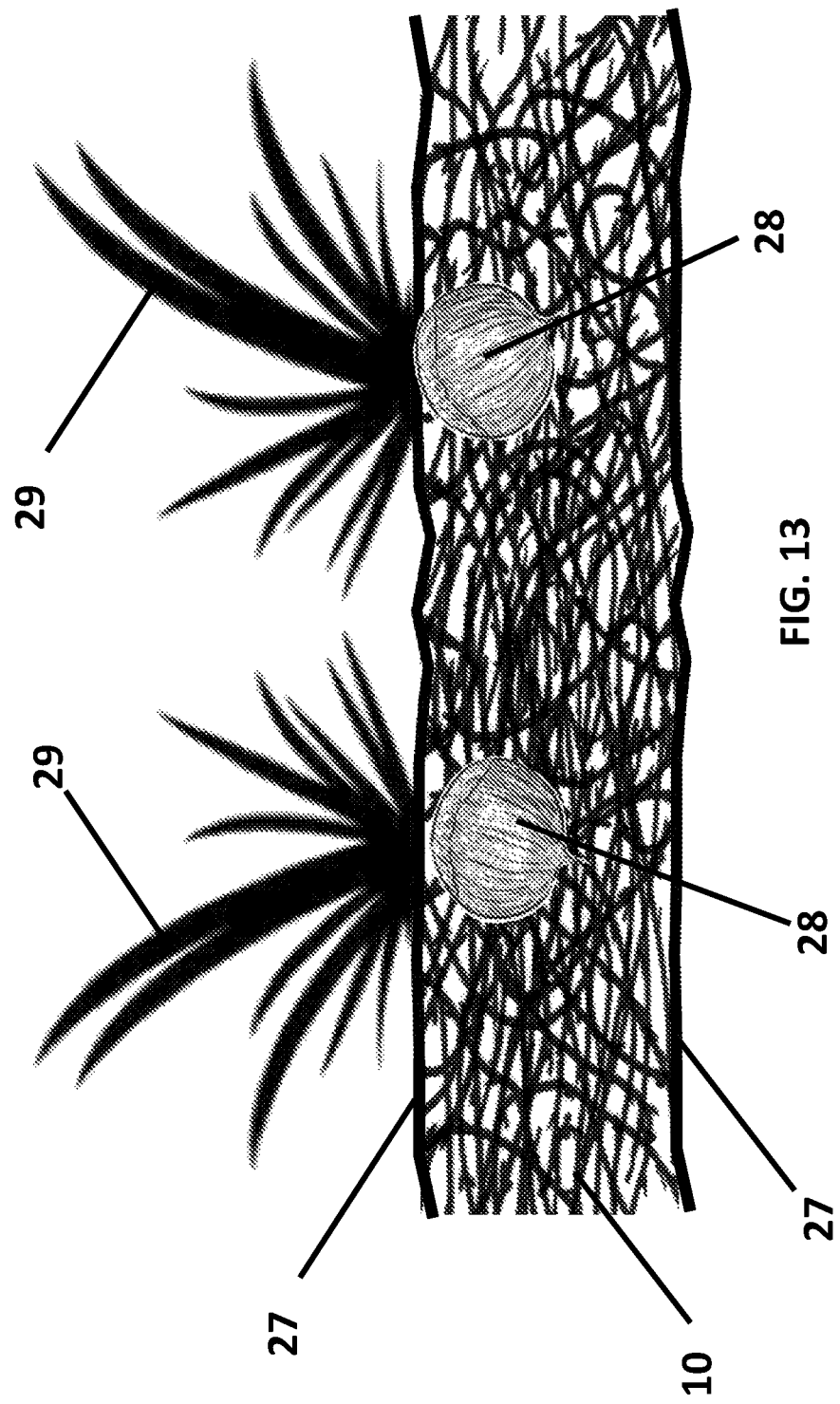
FIG. 13 shows an image of the woody biotic filament structure of biotic materials that can be used to grow plants after being used in an insulating packaging container assembly, e.g., a shipping cooler, in accordance with an embodiment of the subject invention.

Specific embodiments of the invention can form, using a biotic filament insulation medium, an insulation pad, an insulated packaging container, insulated packaging pouch, or an insulated shipping container, where composting accelerator or activator is incorporated with the biotic filament insulation medium (e.g., embedded in the biotic filament insulation medium), to increase the speed of composting after the pad or container are used and disposed for composting. Specific embodiments can also be placed on/in the ground after initial use and become a garden mat where flowers and vegetables can grow, and can optionally have seeds (28) embedded in the biotic insulation medium prior to use. FIG. 13 shows an embodiment of a woody biotic filament flexible insulation pad, incorporating a biotic filament insulation medium (made of woody biotic filaments (10) and wrapped in paper (27)), on the ground with bean plants (29) growing in the biotic filament insulation medium after use of the biotic filament insulation medium for shipping a product. Many other treatments can be done to the biotic filament insulation medium to increase its versatility, such as having a fire retardant, fragrance, anti-bacterial compound, and/or an anti-microbial compound applied to the biotic filament insulation medium.

REFERENCES

Gaiselmann G, I Manke, W. Lehnert AND V. Schmidt. 2013 Extraction of curved fibers from 3D data. Image Anal Stereol 2013; 32:57-63
Suresh Babu. R, Karthikeyan. V, Vignesh Kumar. G. 2015. Investigation of Thermal Insulation on Ice Coolers. IOSR-JMCE. Vol. 12. January-February 2015, pp 75-79
Woodside, W. 1958. Calculation of Thermal Conductivity of Porous Media. Can. J. Phys. Vol 36 (1958), Building Services Section, Division of Building Research, National Research Council, Ottawa, Canada. Issues as N.R.C. No. 477

The invention claimed is:
1. A method of providing a thermal environment to a payload transported and/or stored in a surrounding environment, comprising:
   providing a packaging container having an inner surface and an outer surface, wherein the inner surface defines an interior of the packaging container;
   providing a biotic material insulation medium;
   comprising a plurality of filaments of biotic material having voids between the filaments, wherein the voids have a gas or gas mixture therein, and wherein the biotic material insulation medium has a permeance for oxygen of at least $15.6 \times 10^3$ $L_{O2}/(m^2$ atm d);
   providing a mechanical structure;
   positioning a payload in the interior of the packaging container;
   positioning the biotic material insulation medium with respect to the payload such that the biotic material insulation medium is between at least a portion of the payload and the outer surface of the container;
   positioning the mechanical structure with respect to the biotic material insulation medium such that the mechanical structure provides mechanical support to the biotic material insulation medium so that the biotic material insulation medium surrounds at least 50% of the payload; and
   positioning the packaging container, with the biotic material insulation medium and mechanical structure, in a surrounding environment,
   wherein the surrounding environment has a surrounding temperature that is (i) above, or (ii) below, respectively, a desired temperature range; and
   wherein, when the packaging container, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment into the interior of the packaging container, or (ii) reduces a rate at which the payload dissipates heat that transfers from into the interior of the packaging container into the surrounding environment.

2. The method according to claim 1,
wherein the plurality of filaments of biotic material comprises at least one of:
   a plurality of filaments of woody biotic material;
   a plurality of filaments of bryophyte biotic material;
   a plurality of filaments of herbaceous biotic material;
   a plurality of filaments of fungi biotic material.

3. The method according to claim 1,
wherein the desired temperature range is 2-8° C., 20-25° C., 0-5° C., 2-4° C., 10-15° C., 15-30° C., 2-30° C., −40-30° C., or below −18° C.

4. The method according to claim 1,
wherein at least 10% of the filaments of the plurality of filaments of biotic material are longer than 15 mm.

5. The method according to claim 1,
wherein at least 80% of the filaments of the plurality of filaments of biotic material are longer than 3.0 inches.

6. The method according to claim 1,
wherein the biotic material insulation medium has a permeance for water vapor of at least $1 \times 10^3$ $g_{water}/(m^2$ atm d).

7. The method according to claim 1,
wherein the payload is food, and
wherein the biotic material insulation medium is positioned around the payload in a food carrier configuration.

8. The method according to claim 1,
wherein the payload is medicine, and
wherein the biotic material insulation medium is positioned around the payload in a medicine shipping package configuration.

9. The method according to claim 1,
wherein the biotic material insulation medium has a permeance for carbon dioxide of at least $23.4 \times 10^3$ $L_{CO2}/(m^2$ atm d).

10. A packaging container assembly, comprising:
   a packaging container having an inner surface and an outer surface, wherein the inner surface defines an interior of the packaging container;
   a biotic material insulation medium,
   comprising a plurality of filaments of biotic material having voids between the filaments wherein the voids have a gas or gas mixture therein and wherein the biotic material insulation medium has a permeance for oxygen of at least $15.6 \times 10^3$ $L^{O2}/(m^2$ atm d);
   a mechanical structure;
   wherein the packaging container assembly is configured to position a payload in the interior of the packaging container;
   wherein the biotic material insulation medium is positioned between at least a portion of the payload and the outer surface of the container;
   wherein the mechanical structure is positioned with respect to the biotic material insulation medium such that the mechanical structure provides mechanical support to the biotic material insulation medium so that the biotic material insulation medium surrounds at least 50% of the payload; and
   wherein the packaging container, with the biotic material insulation medium and mechanical structure, is configured to be positioned in a surrounding environment, wherein the surrounding environment has a surrounding temperature that is (i) above, or (ii) below, respectively, a desired temperature range; and wherein, when the packaging container, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment into the interior of the packaging container, or (ii) reduces a rate at which the payload dissipates heat that transfers from into the interior of the packaging container into the surrounding environment.

11. The packaging container assembly according to claim 10,
wherein the plurality of filaments of biotic material comprises at least one of:
a plurality of filaments of woody biotic material;
a plurality of filaments of bryophyte biotic material;
a plurality of filaments of herbaceous biotic material; and
a plurality of filaments of fungi biotic material.

12. The packaging container assembly according to claim 10,
wherein at least 10% of the voids between the material of the biotic filament insulation medium are larger than 1 cubic millimeter.

13. The packaging container assembly according to claim 10,
wherein the filaments of the plurality of filaments of biotic material have an overall tortuosity greater than 1.0.

14. The packaging container assembly according to claim 10,
wherein the plurality of filaments of biotic material is aspen and/or great lakes aspen.

15. The packaging container assembly according to claim 10,
wherein the biotic material insulation medium has a thermal conductivity in the range from 0.015 to 0.3 W/m-K.

16. The packaging container assembly according to claim 10,
wherein at least a portion of the biotic material insulation medium facing toward the outer surface of the container has an effective thermal effusivity of less than 125 W-s$^{1/2}$/m$^2$-K.

17. The packaging container assembly according to claim 10,
wherein the biotic material insulation medium has an R-value for a thickness of 25.4 mm (1 inch) in the range 0.35 to 0.88 m$^2$K/W for an apparent bulk density in the range 25 to 120 kg/m$^2$.

18. The packaging container assembly according to claim 1,
wherein at least 10% of the filaments of the plurality of filaments of biotic material are longer than 15 mm.

19. The packaging container assembly according to claim 10,
wherein at least 80% of the filaments of the plurality of filaments of biotic material are longer than 3.0 inches.

20. The packaging container assembly according to claim 10,
wherein the biotic material insulation medium comprises loose materials between portions of the mechanical structure.

21. The method according to claim 10,
wherein the biotic material insulation medium has a permeance for carbon dioxide of at least 23.4×10$^3$ L$_{CO2}$/(m$^2$ atm d).

22. The packaging container assembly according to claim 10,
wherein the biotic material insulation medium has a permeance for water vapor of at least 1×10$^3$ g$_{water}$/(m$^2$ atm d).

23. The packaging container assembly according to claim 10,
wherein the biotic material insulation medium can be compressed by compressive pressure to less than 90% of its initial thickness and recover at least 75% of its thickness after the compressive pressure is released.

24. The packaging container assembly according to claim 10,
wherein the filaments of the biotic material insulation medium have a water content of 10% to 35%.

25. The packaging container assembly according to claim 1,
wherein the biotic material insulation medium has a compost accelerator or activator embedded to promote rapid composting.

26. The packaging container assembly according to claim 10,
wherein the biotic material insulation medium has a thickness in the range of 5 mm to 102 mm.

27. A method of providing a thermal environment to a payload transported and/or stored in a surrounding environment, comprising:
providing a packaging container having an inner surface and an outer surface, wherein the inner surface defines an interior of the packaging container;
providing a biotic material insulation medium comprising a plurality of filaments of biotic material having voids between the filaments, wherein the voids have a gas or gas mixture therein, and wherein the biotic material insulation medium has a permeance for carbon dioxide of at least 23.4×10$^3$ L$_{CO2}$/(m$^2$ atm d);
providing a mechanical structure;
positioning a payload in the interior of the packaging container;
positioning the biotic material insulation medium with respect to the payload such that the biotic material insulation medium is between at least a portion of the payload and the outer surface of the container;
positioning the mechanical structure with respect to the biotic material insulation medium such that the mechanical structure provides mechanical support to the biotic material insulation medium so that the biotic material insulation medium surrounds at least 50% of the payload; and
positioning the packaging container, with the biotic material insulation medium and mechanical structure, in a surrounding environment,
wherein the surrounding environment has a surrounding temperature that is (i) above, or (ii) below, respectively, a desired temperature range; and
wherein, when the packaging container, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment into the interior of the packaging container, or (ii) reduces a rate at which the payload dissipates heat that transfers from into the interior of the packaging container into the surrounding environment.

28. The method according to claim 27,
wherein the plurality of filaments of biotic material comprises at least one of:
a plurality of filaments of woody biotic material;
a plurality of filaments of bryophyte biotic material;
a plurality of filaments of herbaceous biotic material; and
a plurality of filaments of fungi biotic material.

29. The method according to claim 27,
wherein the desired temperature range is 2-8° C., 20-25° C., 0-5° C., 2-4° C., 10-15° C., 15-30° C., 2-30° C., −40-30° C., or below −18° C.

30. The method according to claim 27,
wherein at least 10% of the filaments of the plurality of filaments of biotic material are longer than 15 mm.

31. The method according to claim 27,
wherein at least 80% of the filaments of the plurality of filaments of biotic material are longer than 3.0 inches.

32. The method according to claim 27,
wherein the biotic material insulation medium has a permeance for oxygen of at least $15.6 \times 10^3$ $L_{O2}/(m^2$ atm d).

33. The method according to claim 27,
wherein the biotic material insulation medium has a permeance for water vapor of at least $1 \times 10^3$ $g_{water}/(m^2$ atm d).

34. The method according to claim 27,
wherein the payload is food, and
wherein the biotic material insulation medium is positioned around the payload in a food carrier configuration.

35. The method according to claim 27,
wherein the payload is medicine, and
wherein the biotic material insulation medium is positioned around the payload in a medicine shipping package configuration.

36. A packaging container assembly, comprising:
a packaging container having an inner surface and an outer surface, wherein the inner surface defines an interior of the packaging container;
a biotic material insulation medium, comprising a plurality of filaments of biotic material having voids between the filaments wherein the voids have a gas or gas mixture therein and wherein the biotic material insulation medium has a permeance for carbon dioxide of at least $23.4 \times 10^3$ $L_{CO2}/(m^2$ atm d);
a mechanical structure;
wherein the packaging container assembly is configured to position a payload in the interior of the packaging container;
wherein the biotic material insulation medium is positioned between at least a portion of the payload and the outer surface of the container;
wherein the mechanical structure is positioned with respect to the biotic material insulation medium such that the mechanical structure provides mechanical support to the biotic material insulation medium so that the biotic material insulation medium surrounds at least 50% of the payload; and
wherein the packaging container, with the biotic material insulation medium and mechanical structure, is configured to be positioned in a surrounding environment,
wherein the surrounding environment has a surrounding temperature that is (i) above, or (ii) below, respectively, a desired temperature range; and
wherein, when the packaging container, with the biotic material insulation medium and mechanical structure, is positioned in the surrounding environment such that the payload has a payload temperature within the desired temperature range, the biotic material insulation medium (i) reduces a rate at which the payload absorbs heat that transfers from the surrounding environment into the interior of the packaging container, or (ii) reduces a rate at which the payload dissipates heat that transfers from into the interior of the packaging container into the surrounding environment.

37. The packaging container assembly according to claim 36,
wherein the plurality of filaments of biotic material comprises at least one of:
a plurality of filaments of woody biotic material;
a plurality of filaments of bryophyte biotic material;
a plurality of filaments of herbaceous biotic material; and
a plurality of filaments of fungi biotic material.

38. The packaging container assembly according to claim 36,
wherein at least a portion of the biotic material insulation medium has an apparent bulk density in a range from 25 kg/m³ to 90 kg/m³.

39. The packaging container assembly according to claim 36,
wherein the filaments of biotic material of the plurality of filaments of biotic material have a density ranging from 96 kg/m³ to 960 kg/m³.

40. The packaging container assembly according to claim 36,
wherein the plurality of filaments of biotic material is a plurality of filaments of woody biotic material,
wherein each filament of woody biotic material of the plurality of filaments of woody biotic material has a modulus of elasticity ranging from 500 kg/mm² to 1600 kg/mm².

41. The packaging container assembly according to claim 36,
wherein the biotic material insulation medium has an apparent porosity of at least 0.8.

42. The packaging container assembly according to claim 36,
wherein at least 10% of the voids between the filaments of the biotic material insulation medium are larger than 1 cubic millimeter.

43. The packaging container assembly according to claim 42,
wherein each filament of woody biotic material of the plurality of filaments of woody biotic material has a modulus of rupture ranging from 4 kg/mm² to 14 kg/mm².

44. The packaging container assembly according to claim 36,
wherein the filaments of the plurality of filaments of biotic material have an overall tortuosity greater than 1.0.

45. The packaging container assembly according to claim 36,
wherein the plurality of filaments of biotic material is aspen and/or great lakes aspen.

46. The packaging container assembly according to claim 36,
wherein the biotic material insulation medium has a thermal conductivity in the range from 0.015 to 0.3 W/m-K.

47. The packaging container assembly according to claim 36,
wherein at least a portion of the biotic material insulation medium facing toward the outer surface of the container has an effective thermal effusivity of less than 125 $W\text{-}s^{1/2}/m^2\text{-}K$.

48. The packaging container assembly according to claim 36,
wherein the biotic material insulation medium has an R-value for a thickness of 25.4 mm (1 inch) in the range 0.35 to 0.88 $m^2K/W$ for an apparent bulk density in the range 25 to 120 $kg/m^2$.

49. The packaging container assembly according to claim 36,
wherein at least 10% of the filaments of the plurality of filaments of biotic material are longer than 15 mm.

50. The packaging container assembly according to claim 36,
wherein at least 80% of the filaments of the plurality of filaments of biotic material are longer than 3.0 inches.

51. The packaging container assembly according to claim 36,
wherein the biotic material insulation medium comprises loose materials between portions of the mechanical structure.

52. The packaging container assembly according to claim 36,
wherein the biotic material insulation medium has a permeance for oxygen of at least $15.6 \times 10^3$ $L_{O2}/(m^2$ atm d).

53. The packaging container assembly according to claim 36,
wherein the biotic material insulation medium has a permeance for water vapor of at least $1 \times 10^3$ $g_{water}/(m^2$ atm d).

54. The packaging container assembly according to claim 36,
wherein the biotic material insulation medium can be compressed by compressive pressure to less than 90% of its initial thickness and recover at least 75% of its thickness after the compressive pressure is released.

55. The packaging container assembly according to claim 36,
wherein the filaments of the biotic material insulation medium have a water content of 10% to 35%.

56. The packaging container assembly according to claim 36,
wherein the biotic material insulation medium has a compost accelerator or activator embedded to promote rapid composting.

57. The packaging container assembly according to claim 36,
wherein the biotic material insulation medium has a thickness in the range of 5 mm to 102 mm.

* * * * *

UNITED STATES PATENT AND TRADEMARK OFFICE
CERTIFICATE OF CORRECTION

PATENT NO. : 11,958,677 B2
APPLICATION NO. : 17/256462
DATED : April 16, 2024
INVENTOR(S) : Melissa Germain and Jean-Pierre Emond It is certified that error appears in the above-identified patent and that said Letters Patent is hereby corrected as shown below:

In the Specification

Column 13,
Line 22, "Embodiment $10^3$." should read --Embodiment 103.--
Line 29, "82-$10^3$," should read --82-103,--
Line 38, "125 W-svm/m$^2$-K" should read --125 W-s$^{1/2}$/m$^2$-K--

Column 14,
Line 28, "atm d)" should read --atm d).--

Column 21,
Lines 11-12, "radiation (5))" should read --radiation (5)--

Column 25,
Line 5, "filaments 3.0" should read --filaments $\geq$ 3.0--

Column 29,
Line 8, "= 39.6 W-s/m$^2$-K" should read --= 39.6 W-s$^{1/2}$/m$^2$-K--

Column 33,
Line 24, "Medium "thickness =" should read --Medium 1" thickness =--

Column 39,
Line 6, "57-63" should read --57-63.--
Line 24, "75-79" should read --75-79.--
Line 29, "477" should read --477.--

Signed and Sealed this
First Day of October, 2024

Katherine Kelly Vidal
*Director of the United States Patent and Trademark Office*

In the Claims

Column 40,
Line 11, "material;" should read --material; and--
Line 50, "L$^{O2}$" should read --L$_{O2}$--

Column 42,
Lines 20-21, "to claim 1," should read --to claim 10,--